(12) United States Patent
Richardson et al.

(10) Patent No.: US 8,676,918 B2
(45) Date of Patent: *Mar. 18, 2014

(54) POINT OF PRESENCE MANAGEMENT IN REQUEST ROUTING

(75) Inventors: David R. Richardson, Seattle, WA (US); John Cormie, Seattle, WA (US); Colm MacCarthaigh, Seattle, WA (US); Benjamin W. S. Redman, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/620,976

(22) Filed: Sep. 15, 2012

(65) Prior Publication Data
US 2013/0346534 A1 Dec. 26, 2013

Related U.S. Application Data

(62) Division of application No. 12/892,822, filed on Sep. 28, 2010, now Pat. No. 9,468,247.

(51) Int. Cl.
G06F 15/167 (2006.01)
(52) U.S. Cl.
USPC ........... 709/213; 709/223; 709/224; 709/225; 709/226; 709/238
(58) Field of Classification Search
USPC ....................................................... 709/213
See application file for complete search history.

(56) References Cited

U.S. PATENT DOCUMENTS

| | | |
|---|---|---|
| 5,341,477 A | 8/1994 | Pitkin et al. |
| 5,611,049 A | 3/1997 | Pitts |
| 5,774,660 A | 6/1998 | Brendel et al. |
| 5,892,914 A | 4/1999 | Pitts |
| 5,933,811 A | 8/1999 | Angles et al. |
| 5,974,454 A | 10/1999 | Apfel et al. |
| 6,016,512 A | 1/2000 | Huitema |
| 6,026,452 A | 2/2000 | Pitts |

(Continued)

FOREIGN PATENT DOCUMENTS

| | | |
|---|---|---|
| CN | 1422468 A | 6/2003 |
| CN | 1605182 A | 4/2005 |

(Continued)

OTHER PUBLICATIONS

Singapore Written Opinion in Application No. 201006836-9, mailed Apr. 30, 2012 in 10 pages.

(Continued)

*Primary Examiner* — Hua Fan
(74) *Attorney, Agent, or Firm* — Knobbe, Martens, Olson & Bear, LLP

(57) ABSTRACT

A system and method for the management of client computing device DNS queries and subsequent resource requests within a content delivery network service provider domain are provided. The management of the DNS queries can include the selection of computing devices corresponding to various Point of Presence locations for processing DNS queries. Additionally, the management of the content requests can include the selection of computing devices corresponding to resource cache components corresponding to various Point of Presence locations for providing requested content. The selection of the computing devices can incorporate logic related to geographic criteria, performance threshold criteria, testing criteria, and the like.

25 Claims, 13 Drawing Sheets

(56) References Cited

U.S. PATENT DOCUMENTS

| | | | |
|---|---|---|---|
| 6,052,718 A | 4/2000 | Gifford |
| 6,085,234 A | 7/2000 | Pitts et al. |
| 6,098,096 A | 8/2000 | Tsirigotis et al. |
| 6,108,703 A | 8/2000 | Leighton et al. |
| 6,182,111 B1 | 1/2001 | Inohara et al. |
| 6,185,598 B1 | 2/2001 | Farber et al. |
| 6,192,051 B1 | 2/2001 | Lipman et al. |
| 6,205,475 B1 | 3/2001 | Pitts |
| 6,223,288 B1 | 4/2001 | Byrne |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,411,967 B1 | 6/2002 | Van Renesse |
| 6,415,280 B1 | 7/2002 | Farber et al. |
| 6,430,607 B1 | 8/2002 | Kavner |
| 6,438,592 B1 | 8/2002 | Killian |
| 6,457,047 B1 | 9/2002 | Chandra et al. |
| 6,459,909 B1 | 10/2002 | Bilcliff et al. |
| 6,484,143 B1 | 11/2002 | Swildens et al. |
| 6,505,241 B2 | 1/2003 | Pitts |
| 6,529,953 B1 | 3/2003 | Van Renesse |
| 6,553,413 B1 | 4/2003 | Leighton et al. |
| 6,560,610 B1 | 5/2003 | Eatherton et al. |
| 6,611,873 B1 | 8/2003 | Kanehara |
| 6,654,807 B2 | 11/2003 | Farber et al. |
| 6,658,462 B1 | 12/2003 | Dutta |
| 6,678,791 B1 | 1/2004 | Jacobs et al. |
| 6,694,358 B1 | 2/2004 | Swildens et al. |
| 6,697,805 B1 | 2/2004 | Choquier et al. |
| 6,724,770 B1 | 4/2004 | Van Renesse |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,769,031 B1 | 7/2004 | Bero |
| 6,782,398 B1 | 8/2004 | Bahl |
| 6,785,704 B1 | 8/2004 | McCanne |
| 6,804,706 B2 | 10/2004 | Pitts |
| 6,810,291 B2 | 10/2004 | Card et al. |
| 6,810,411 B1 | 10/2004 | Coughlin et al. |
| 6,829,654 B1 | 12/2004 | Jungck |
| 6,874,017 B1 | 3/2005 | Inoue et al. |
| 6,963,850 B1 | 11/2005 | Bezos et al. |
| 6,981,017 B1 | 12/2005 | Kasriel et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,032,010 B1 | 4/2006 | Swildens et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,099,936 B2 | 8/2006 | Chase et al. |
| 7,103,645 B2 | 9/2006 | Leighton et al. |
| 7,117,262 B2 | 10/2006 | Bai et al. |
| 7,133,905 B2 | 11/2006 | Dilley et al. |
| 7,139,821 B1 | 11/2006 | Shah et al. |
| 7,143,169 B2 | 11/2006 | Champagne et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,174,382 B2 | 2/2007 | Ramanathan et al. |
| 7,185,063 B1 | 2/2007 | Kasriel et al. |
| 7,188,214 B1 | 3/2007 | Kasriel et al. |
| 7,194,522 B1 | 3/2007 | Swildens et al. |
| 7,200,667 B2 | 4/2007 | Teodosiu et al. |
| 7,225,254 B1 | 5/2007 | Swildens et al. |
| 7,228,350 B2 | 6/2007 | Hong et al. |
| 7,233,978 B2 | 6/2007 | Overton et al. |
| 7,240,100 B1 | 7/2007 | Wein et al. |
| 7,254,636 B1 | 8/2007 | O'Toole, Jr. et al. |
| 7,260,598 B1 | 8/2007 | Liskov et al. |
| 7,269,784 B1 | 9/2007 | Kasriel et al. |
| 7,289,519 B1 | 10/2007 | Liskov |
| 7,293,093 B2 | 11/2007 | Leighton |
| 7,310,686 B2 | 12/2007 | Uysal |
| 7,316,648 B2 | 1/2008 | Kelly et al. |
| 7,320,131 B1 | 1/2008 | O'Toole, Jr. |
| 7,321,918 B2 | 1/2008 | Burd et al. |
| 7,363,291 B1 | 4/2008 | Page |
| 7,430,610 B2 | 9/2008 | Pace et al. |
| 7,441,045 B2 * | 10/2008 | Skene et al. .................. 709/241 |
| 7,461,170 B1 | 12/2008 | Taylor et al. |
| 7,464,142 B2 | 12/2008 | Flurry et al. |
| 7,492,720 B2 | 2/2009 | Pruthi et al. |
| 7,499,998 B2 | 3/2009 | Toebes et al. |
| 7,502,836 B1 | 3/2009 | Menditto et al. |
| 7,519,720 B2 | 4/2009 | Fishman et al. |
| 7,548,947 B2 | 6/2009 | Kasriel et al. |
| 7,552,235 B2 | 6/2009 | Chase et al. |
| 7,565,407 B1 | 7/2009 | Hayball |
| 7,573,916 B1 | 8/2009 | Bechtolsheim et al. |
| 7,594,189 B1 | 9/2009 | Walker et al. |
| 7,623,460 B2 | 11/2009 | Miyazaki |
| 7,624,169 B2 | 11/2009 | Lisiecki et al. |
| 7,640,296 B2 | 12/2009 | Fuchs et al. |
| 7,650,376 B1 | 1/2010 | Blumenau |
| 7,653,700 B1 | 1/2010 | Bahl et al. |
| 7,653,725 B2 | 1/2010 | Yahiro et al. |
| 7,657,622 B1 | 2/2010 | Douglis et al. |
| 7,680,897 B1 | 3/2010 | Carter et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,716,367 B1 | 5/2010 | Leighton et al. |
| 7,725,602 B2 | 5/2010 | Liu et al. |
| 7,739,400 B2 | 6/2010 | Lindbo et al. |
| 7,747,720 B2 | 6/2010 | Toebes et al. |
| 7,756,913 B1 | 7/2010 | Day |
| 7,761,572 B1 | 7/2010 | Auerbach |
| 7,769,823 B2 | 8/2010 | Jenny et al. |
| 7,773,596 B1 | 8/2010 | Marques |
| 7,774,342 B1 | 8/2010 | Virdy |
| 7,787,380 B1 | 8/2010 | Aggarwal et al. |
| 7,792,989 B2 | 9/2010 | Toebes et al. |
| 7,809,597 B2 | 10/2010 | Das et al. |
| 7,813,308 B2 | 10/2010 | Reddy et al. |
| 7,818,454 B2 | 10/2010 | Kim et al. |
| 7,836,177 B2 | 11/2010 | Kasriel et al. |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,427 B2 | 4/2011 | Josefsberg et al. |
| 7,933,988 B2 | 4/2011 | Nasuto et al. |
| 7,937,477 B1 | 5/2011 | Day et al. |
| 7,949,779 B2 | 5/2011 | Farber et al. |
| 7,962,597 B2 | 6/2011 | Richardson et al. |
| 7,966,404 B2 | 6/2011 | Hedin et al. |
| 7,979,509 B1 | 7/2011 | Malmskog et al. |
| 7,991,910 B2 | 8/2011 | Richardson et al. |
| 7,996,535 B2 | 8/2011 | Auerbach |
| 8,000,724 B1 | 8/2011 | Rayburn et al. |
| 8,028,090 B2 | 9/2011 | Richardson et al. |
| 8,065,275 B2 | 11/2011 | Eriksen et al. |
| 8,069,231 B2 | 11/2011 | Schran et al. |
| 8,073,940 B1 | 12/2011 | Richardson et al. |
| 8,082,348 B1 | 12/2011 | Averbuj et al. |
| 8,117,306 B1 | 2/2012 | Baumback et al. |

(56) References Cited

U.S. PATENT DOCUMENTS

| | | |
|---|---|---|
| 8,122,098 B1 | 2/2012 | Richardson et al. |
| 8,122,124 B1 | 2/2012 | Baumback et al. |
| 8,135,820 B2 | 3/2012 | Richardson et al. |
| 8,190,682 B2 | 5/2012 | Paterson-Jones et al. |
| 8,301,645 B1 | 10/2012 | Crook |
| 8,321,568 B2 | 11/2012 | Sivasubramanian et al. |
| 8,402,137 B2 | 3/2013 | Sivasubramanian et al. |
| 2001/0000811 A1 | 5/2001 | May et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1* | 12/2001 | Skene et al. .................. 709/226 |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0007413 A1 | 1/2002 | Garcia-Luna-Aceves et al. |
| 2002/0048269 A1 | 4/2002 | Hong et al. |
| 2002/0049608 A1 | 4/2002 | Hartsell et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0087374 A1 | 7/2002 | Boubez et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0107944 A1 | 8/2002 | Bai et al. |
| 2002/0116481 A1 | 8/2002 | Lee |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0143989 A1 | 10/2002 | Huitema et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0156911 A1 | 10/2002 | Croman et al. |
| 2002/0161767 A1 | 10/2002 | Shapiro et al. |
| 2002/0163882 A1 | 11/2002 | Bornstein et al. |
| 2002/0188722 A1 | 12/2002 | Banerjee et al. |
| 2002/0198953 A1 | 12/2002 | O'Rourke et al. |
| 2003/0002484 A1 | 1/2003 | Freedman |
| 2003/0009591 A1 | 1/2003 | Hayball et al. |
| 2003/0028642 A1 | 2/2003 | Agarwal et al. |
| 2003/0033283 A1 | 2/2003 | Evans et al. |
| 2003/0037139 A1 | 2/2003 | Shteyn |
| 2003/0065739 A1 | 4/2003 | Shnier |
| 2003/0074401 A1 | 4/2003 | Connell et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0101278 A1 | 5/2003 | Garcia-Luna-Aceves et al. |
| 2003/0120741 A1 | 6/2003 | Wu et al. |
| 2003/0133554 A1 | 7/2003 | Nykanen et al. |
| 2003/0135509 A1 | 7/2003 | Davis et al. |
| 2003/0140087 A1 | 7/2003 | Lincoln et al. |
| 2003/0145038 A1 | 7/2003 | Bin Tariq et al. |
| 2003/0145066 A1 | 7/2003 | Okada et al. |
| 2003/0149581 A1 | 8/2003 | Chaudhri et al. |
| 2003/0154284 A1 | 8/2003 | Bernardin et al. |
| 2003/0163722 A1 | 8/2003 | Anderson, IV |
| 2003/0172145 A1* | 9/2003 | Nguyen .................. 709/223 |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0229682 A1 | 12/2003 | Day |
| 2003/0233423 A1 | 12/2003 | Dilley et al. |
| 2003/0236700 A1 | 12/2003 | Arning et al. |
| 2004/0010621 A1 | 1/2004 | Afergan et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0059805 A1 | 3/2004 | Dinker et al. |
| 2004/0064501 A1 | 4/2004 | Jan et al. |
| 2004/0073596 A1 | 4/2004 | Kloninger et al. |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083307 A1 | 4/2004 | Uysal |
| 2004/0117455 A1 | 6/2004 | Kaminsky et al. |
| 2004/0128344 A1 | 7/2004 | Trossen |
| 2004/0128346 A1 | 7/2004 | Melamed et al. |
| 2004/0167981 A1 | 8/2004 | Douglas et al. |
| 2004/0172466 A1 | 9/2004 | Douglas et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0249971 A1 | 12/2004 | Klinker |
| 2004/0249975 A1 | 12/2004 | Tuck et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0021706 A1 | 1/2005 | Maggi et al. |
| 2005/0038967 A1 | 2/2005 | Umbehocker et al. |
| 2005/0044270 A1 | 2/2005 | Grove et al. |
| 2005/0102683 A1 | 5/2005 | Branson et al. |
| 2005/0108169 A1 | 5/2005 | Balasubramanian et al. |
| 2005/0108529 A1 | 5/2005 | Juneau |
| 2005/0114296 A1 | 5/2005 | Farber et al. |
| 2005/0132083 A1 | 6/2005 | Raciborski et al. |
| 2005/0157712 A1 | 7/2005 | Rangarajan et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0188073 A1 | 8/2005 | Nakamichi et al. |
| 2005/0192008 A1 | 9/2005 | Desai et al. |
| 2005/0216569 A1 | 9/2005 | Coppola et al. |
| 2005/0216674 A1 | 9/2005 | Robbin et al. |
| 2005/0232165 A1 | 10/2005 | Brawn et al. |
| 2005/0259672 A1 | 11/2005 | Eduri |
| 2005/0262248 A1 | 11/2005 | Jennings, III et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0036720 A1 | 2/2006 | Faulk, Jr. |
| 2006/0037037 A1 | 2/2006 | Miranz |
| 2006/0041614 A1 | 2/2006 | Oe |
| 2006/0047787 A1 | 3/2006 | Agarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |

(56) References Cited

U.S. PATENT DOCUMENTS

| | | |
|---|---|---|
| 2006/0064500 A1 | 3/2006 | Roth et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0112066 A1* | 5/2006 | Hamzy ............................ 707/1 |
| 2006/0112176 A1 | 5/2006 | Liu et al. |
| 2006/0120385 A1 | 6/2006 | Atchison et al. |
| 2006/0129665 A1* | 6/2006 | Toebes et al. ................ 709/223 |
| 2006/0143293 A1 | 6/2006 | Freedman |
| 2006/0155823 A1 | 7/2006 | Tran et al. |
| 2006/0161541 A1 | 7/2006 | Cencini |
| 2006/0168088 A1 | 7/2006 | Leighton et al. |
| 2006/0184936 A1 | 8/2006 | Abels et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0218304 A1 | 9/2006 | Mukherjee et al. |
| 2006/0227740 A1 | 10/2006 | McLaughlin et al. |
| 2006/0230137 A1 | 10/2006 | Gare et al. |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2007/0005689 A1 | 1/2007 | Leighton et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0038994 A1 | 2/2007 | Davis et al. |
| 2007/0041393 A1 | 2/2007 | Westhead et al. |
| 2007/0043859 A1 | 2/2007 | Ruul |
| 2007/0050522 A1 | 3/2007 | Grove et al. |
| 2007/0055764 A1 | 3/2007 | Dilley et al. |
| 2007/0076872 A1 | 4/2007 | Juneau |
| 2007/0086429 A1 | 4/2007 | Lawrence et al. |
| 2007/0094361 A1 | 4/2007 | Hoynowski et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0198982 A1 | 8/2007 | Bolan et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0244964 A1 | 10/2007 | Challenger et al. |
| 2007/0250467 A1 | 10/2007 | Mesnik et al. |
| 2007/0250560 A1 | 10/2007 | Wein et al. |
| 2007/0253377 A1 | 11/2007 | Janneteau et al. |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0271385 A1 | 11/2007 | Davis et al. |
| 2007/0280229 A1 | 12/2007 | Kenney |
| 2007/0288588 A1 | 12/2007 | Wein et al. |
| 2008/0005057 A1 | 1/2008 | Ozzie et al. |
| 2008/0008089 A1 | 1/2008 | Bornstein et al. |
| 2008/0025304 A1 | 1/2008 | Venkataswami et al. |
| 2008/0046596 A1 | 2/2008 | Afergan et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0086574 A1 | 4/2008 | Raciborski et al. |
| 2008/0103805 A1 | 5/2008 | Shear et al. |
| 2008/0104268 A1 | 5/2008 | Farber et al. |
| 2008/0114829 A1 | 5/2008 | Button et al. |
| 2008/0134043 A1 | 6/2008 | Georgis et al. |
| 2008/0147866 A1 | 6/2008 | Stolorz et al. |
| 2008/0147873 A1 | 6/2008 | Matsumoto |
| 2008/0155061 A1 | 6/2008 | Afergan et al. |
| 2008/0155614 A1 | 6/2008 | Cooper et al. |
| 2008/0162667 A1 | 7/2008 | Verma et al. |
| 2008/0172488 A1 | 7/2008 | Jawahar et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215735 A1 | 9/2008 | Farber et al. |
| 2008/0215750 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228920 A1 | 9/2008 | Souders et al. |
| 2008/0235400 A1 | 9/2008 | Slocombe et al. |
| 2008/0275772 A1 | 11/2008 | Suryanarayana et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0319862 A1 | 12/2008 | Golan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0049098 A1 | 2/2009 | Pickelsimer et al. |
| 2009/0070533 A1 | 3/2009 | Elazary et al. |
| 2009/0083228 A1 | 3/2009 | Shatz et al. |
| 2009/0086741 A1 | 4/2009 | Zhang |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0177667 A1 | 7/2009 | Ramos et al. |
| 2009/0182815 A1 | 7/2009 | Czechowski et al. |
| 2009/0182945 A1 | 7/2009 | Aviles et al. |
| 2009/0187575 A1 | 7/2009 | DaCosta |
| 2009/0204682 A1 | 8/2009 | Jeyaseelan et al. |
| 2009/0210549 A1 | 8/2009 | Hudson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0259971 A1 | 10/2009 | Rankine et al. |
| 2009/0271577 A1 | 10/2009 | Campana et al. |
| 2009/0271730 A1 | 10/2009 | Rose et al. |
| 2009/0279444 A1 | 11/2009 | Ravindran et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0023601 A1 | 1/2010 | Lewin et al. |
| 2010/0030662 A1 | 2/2010 | Klein |
| 2010/0036944 A1 | 2/2010 | Douglis et al. |
| 2010/0070603 A1 | 3/2010 | Moss et al. |
| 2010/0088367 A1 | 4/2010 | Brown et al. |
| 2010/0088405 A1* | 4/2010 | Huang et al. ................ 709/224 |
| 2010/0100629 A1 | 4/2010 | Raciborski et al. |
| 2010/0111059 A1 | 5/2010 | Bappu et al. |
| 2010/0121953 A1 | 5/2010 | Friedman et al. |
| 2010/0122069 A1 | 5/2010 | Gonion |

(56) References Cited

U.S. PATENT DOCUMENTS

| | | | |
|---|---|---|---|
| 2010/0131646 A1* | 5/2010 | Drako | 709/225 |
| 2010/0150155 A1 | 6/2010 | Napierala | |
| 2010/0192225 A1 | 7/2010 | Ma et al. | |
| 2010/0217801 A1 | 8/2010 | Leighton et al. | |
| 2010/0226372 A1 | 9/2010 | Watanabe | |
| 2010/0257566 A1 | 10/2010 | Matila | |
| 2010/0293479 A1 | 11/2010 | Rousso et al. | |
| 2010/0299439 A1 | 11/2010 | McCarthy et al. | |
| 2010/0318508 A1 | 12/2010 | Brawer et al. | |
| 2010/0332595 A1 | 12/2010 | Fullagar et al. | |
| 2011/0040893 A1 | 2/2011 | Karaoguz et al. | |
| 2011/0078000 A1 | 3/2011 | Ma et al. | |
| 2011/0078230 A1 | 3/2011 | Sepulveda | |
| 2011/0096987 A1 | 4/2011 | Morales et al. | |
| 2011/0153941 A1 | 6/2011 | Spatscheck et al. | |
| 2011/0208876 A1* | 8/2011 | Richardson et al. | 709/238 |
| 2011/0238501 A1 | 9/2011 | Almeida | |
| 2011/0238793 A1 | 9/2011 | Bedare et al. | |
| 2011/0252142 A1 | 10/2011 | Richardson et al. | |
| 2011/0252143 A1 | 10/2011 | Baumback et al. | |
| 2011/0258049 A1 | 10/2011 | Ramer et al. | |
| 2011/0276623 A1 | 11/2011 | Girbal | |
| 2012/0066360 A1 | 3/2012 | Ghosh | |
| 2012/0179839 A1 | 7/2012 | Raciborski et al. | |

FOREIGN PATENT DOCUMENTS

| | | |
|---|---|---|
| CN | 101189598 A | 5/2008 |
| CN | 101460907 A | 6/2009 |
| EP | 2008167 | 12/2008 |
| JP | 2003-167810 A | 6/2003 |
| JP | 2003522358 A | 7/2003 |
| JP | 2007-133896 A | 5/2007 |
| WO | WO 2007/007960 A1 | 1/2007 |
| WO | WO 2007/126837 A3 | 11/2007 |
| WO | WO 2012/044587 A1 | 4/2012 |

OTHER PUBLICATIONS

American Bar Association; Digital Signature Guidelines Tutorial [online]; Feb. 10, 2002 [retrived on Mar. 2, 2010]; American Bar Association Section of Science and Technology Information Security Committee; Retrieved from the internet: <URL: http://web.archive.org/web/20020210124615/www.abanet.org/scitech/ec/isc/dsg-tutorial.html; pp. 1-8.
Baglioni et al., "Preprocessing and Mining Web Log Data for Web Personalization", LNAI 2829, 2003, pp. 237-249.
First Office Action in Chinese Application No. 200980119993.1 dated Jul. 4, 2012.
First Office Action in Chinese Application No. 200980119995.0 dated Jul. 6, 2012.
International Search Report and Written Opinion in PCT/US2011/053302 mailed Nov. 28, 2011 in 11 pages.
International Search Report and Written Opinion in PCT/US2011/061486 mailed Mar. 30, 2012 in 11 pages.
Liu et al., "Combined mining of Web server logs and web contents for classifying user navigation patterns and predicting users' future requests," Data & Knowledge Engineering 61 (2007) pp. 304-330.
Singapore Examination Report in Application No. 201006837-7 mailed May 16, 2012.
Singapore Written Opinion in Application No. 201006836-9, mailed Oct. 12, 2011 in 12 pages.
Singapore Written Opinion in Application No. 201006837-7, mailed Oct. 12, 2011 in 11 pages.
Singapore Written Opinion in Application No. 201006874-0, mailed Oct. 12, 2011 in 10 pages.
Supplementary European Search Report in Application No. 09727694.3 mailed Jan. 30, 2012 in 6 pages.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Xu et al., "Decision tree regression for soft classification of remote sensing data", Remote Sensing of Environment 97 (2005) pp. 322-336.
Barbir, A., et al., "Known Content Network (CN) Request-Routing Mechanisms", Request for Comments 3568, [online], IETF, Jul. 2003, [retrieved on Feb. 26, 2013], Retrieved from the Internet: <URL: http://tools.ietf.org/rfc/rfc3568.txt>.
International Preliminary Report on Patentability in PCT/US2011/053302 mailed Apr. 2, 2013.
Office Action in Chinese Application No. 200780020255.2 dated Mar. 4, 2013.
Office Action in Japanese Application No. 2011-516466 mailed Mar. 6, 2013.
Second Office Action in Chinese Application No. 200980119993.1 dated Mar. 12, 2013.
"Global Server Load Balancing with Serverlron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONGMAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3 .xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
Bellovin, S., "Distributed Firewalls," ;login;:37-39, Nov. 1999, http://www.cs.columbia.edu/-smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.

(56) References Cited

OTHER PUBLICATIONS

Coulson, D., "Network Security Iptables," Apr. 2003, Linuxpro, Part 2, retrieved from http://davidcoulson.net/writing/lxf/38/iptables.pdf, 4 pages.

Coulson, D., "Network Security Iptables," Mar. 2003, Linuxpro, Part 1, retrieved from http://davidcoulson.net/writing/lxf/39/iptables.pdf, 4 pages.

Deleuze, C., et al., A DNS Based Mapping Peering System for Peering CDNs, draft-deleuze-cdnp-dnsmap-peer-00.txt, Nov. 20, 2000, 20 pages.

Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.

First Office Action in Chinese Application No. 200980111426.1 mailed Feb. 16, 2013.

Gruener, J., "A Vision of Togetherness," May 24, 2004, NetworkWorld, retrieved May 3, 2006, from, http://www.networkworld.com/supp/2004/ndc3/0524virt.html, 9 pages.

International Preliminary Report on Patentability in PCT/US2007/007601 mailed Sep. 30, 2008 in 8 pages.

International Search Report and Written Opinion in PCT/US07/07601 mailed Jul. 18, 2008 in 11 pages.

International Search Report and Written Opinion in PCT/US2010/060567 mailed on Mar. 28, 2012.

Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.

Joseph, Joshy, et al., "Introduction to Grid Computing," Apr. 16, 2004, retrieved Aug. 30, 2007, from http://www.informit.com/articles/printerfriendly.aspx?p=169508, 19 pages.

Kenshi, P., "Help File Library: Iptables Basics," Justlinux, retrieved Dec. 1, 2005, from http://www.justlinux.com/nhf/Security/Iptables_Basics.html, 4 pages.

Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.

Office Action in Candian Application No. 2741895 dated Feb. 25, 2013.

Office Action in Japanese Application No. 2011-502138 mailed Feb. 1, 2013.

Office Action in Japanese Application No. 2011-502140 mailed Dec. 7, 2012.

Office Action in Japanese Application No. 2012-052264 mailed Dec. 11, 2012 in 26 pages.

Shankland, S., "Sun to buy start-up to bolster N1 ," Jul. 30, 2003, CNet News.com, retrieved May 3, 2006, http://news.zdnet.com/2100-3513_22-5057752.html, 8 pages.

Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.

Supplementary European Search Report in Application No. 07754164.7 mailed Dec. 20, 2010 in 7 pages.

Supplementary European Search Report in Application No. 09728756.9 mailed Jan. 8, 2013.

Takizawa, et al., "Scalable MultiReplication Framework on The Grid," Report of Study of Information Processing Society of Japan, Information Processing Society, vol. 2004, No. 81, pp. 247-252, Japan, Aug. 1, 2004.

Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.

Vijayan, J., "Terraspring Gives Sun's N1 a Boost," Nov. 25, 2002, Computerworld, retrieved May 3, 2006, from http://www.computerworld.com/printthis/2002/0,4814, 76159,00.html, 3 pages.

Virtual Iron Software Home, Virtual Iron, retrieved May 3, 2006, from http://www.virtualiron.com/, 1 page.

Waldspurger, CA., "Spawn: A Distributed Computational Economy," Feb. 1992, IEEE Transactions on Software Engineering, 18(2): 103-117, 15 pages.

Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.

Yamagata, et al., "A virtual-machine based fast deployment tool for Grid execution environment, " Report of Study of Information Processing Society of Japan, Information Processing Society, vol. 2006, No. 20, pp. 127-132, Japan, Feb. 28, 2006.

Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.

First Office Action in Chinese Application No. 200980145872.4 dated Nov. 29, 2012.

Search Report and Written Opinion in Singapore Application No. 201103333-9 mailed Nov. 19, 2012.

Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).

Bennami, M., et al., Resource Allocation for Autonomic Data Centers Using Analytic Performance Models, 2005, IEEE, 12 pages.

Chipara et al, "Realtime Power-Aware Routing in Sensor Network", IEEE, 2006, 10 pages.

International Preliminary Report on Patentability and Written Opinion in PCT/US2010/060567 mailed on Jun. 19, 2012.

International Preliminary Report on Patentability and Written Opinion in PCT/US2010/060569 mailed Jun. 19, 2012.

International Preliminary Report on Patentability and Written Opinion in PCT/US2010/060573 mailed Jun. 19, 2012.

International Preliminary Report on Patentability in PCT/US2011/061486 mailed May 22, 2013.

Kounev, S., et al., Autonomic QoS-Aware Resource Management in Grid Computing Using Online Performance Models, 2007, ICST, Valuetools, 2007, 10 pages.

Office Action in Canadian Application No. 2726915 dated May 13, 2013.

Office Action in Chinese Application No. 200980119995.0 dated Apr. 15, 2013.

\* cited by examiner

POINT OF PRESENCE MANAGEMENT IN REQUEST ROUTING

CROSS REFERENCE TO RELATED APPLICATIONS

This application is a divisional of U.S. patent application Ser. No. 12/892,822, entitled "POINT OF PRESENCE MANAGEMENT IN REQUEST ROUTING" filed on Sep. 28, 2010, the disclosure of which is incorporated herein by reference.

BACKGROUND

Generally described, computing devices and communication networks can be utilized to exchange information. In a common application, a computing device can request content from another computing device via a communication network. For example, a user, at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices, often with consideration of efficient transmission of the requested content to the client computing device and/or consideration of a cost associated with the transmission of the content. For larger scale implementations, a content provider may receive content requests from a high volume of client computing devices, which can place a strain on the content provider's computing resources. Additionally, the content requested by the client computing devices may have a number of components, which can further place additional strain on the content provider's computing resources.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request(s) for the additional resources to the referenced content provider computing device. Accordingly, in order to satisfy a content request, the content provider would provide client computing devices data associated with the Web page as well as the data associated with the embedded resources (e.g., embedded resource identifiers).

Some content providers attempt to facilitate the delivery of requested content, such as Web pages and/or resources identified in Web pages, through the utilization of a content delivery network ("CDN") service provider. A CDN service provider typically maintains a number of computing devices in a communication network that can maintain content from various content providers. In turn, content providers can instruct, or otherwise suggest to, client computing devices to request some, or all, of the content provider's content from the CDN service provider's computing devices.

As with content providers, CDN service providers are also generally motivated to provide requested content to client computing devices, often with consideration of efficient transmission of the requested content to the client computing device and/or consideration of a cost associated with the transmission of the content. Accordingly, CDN service providers often consider factors such as latency of delivery of requested content in order to meet service level agreements or to generally improve the quality of delivery service. The consideration of such factors can be applied with regard to decisions by a CDN service provider as to which of the several available computing devices is best suited to process client computing device requests for content.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, aspects of the present disclosure are directed to routing of DNS queries from client computing devices. The DNS queries correspond to content requests provided by a network resource, such as content delivery network ("CDN") service providers. Specifically, aspects of the disclosure will be described with regard to the management of client computing device DNS queries and subsequent resource requests within a content delivery network service provider domain. Illustratively, the management of the DNS queries can include the selection of computing devices corresponding to various Point of Presence ("POP") locations for processing DNS queries. Additionally, the management of the content requests can include the selection of computing devices corresponding to resource cache components corresponding to various POP locations for providing requested content. The selection of the computing devices can incorporate logic related to geographic criteria, performance threshold criteria, testing criteria, and the like. Although various aspects of the disclosure will be described with regard to illustrative examples and embodiments, one skilled in the art will appreciate that the disclosed embodiments and examples should not be construed as limiting.

Figure 1:
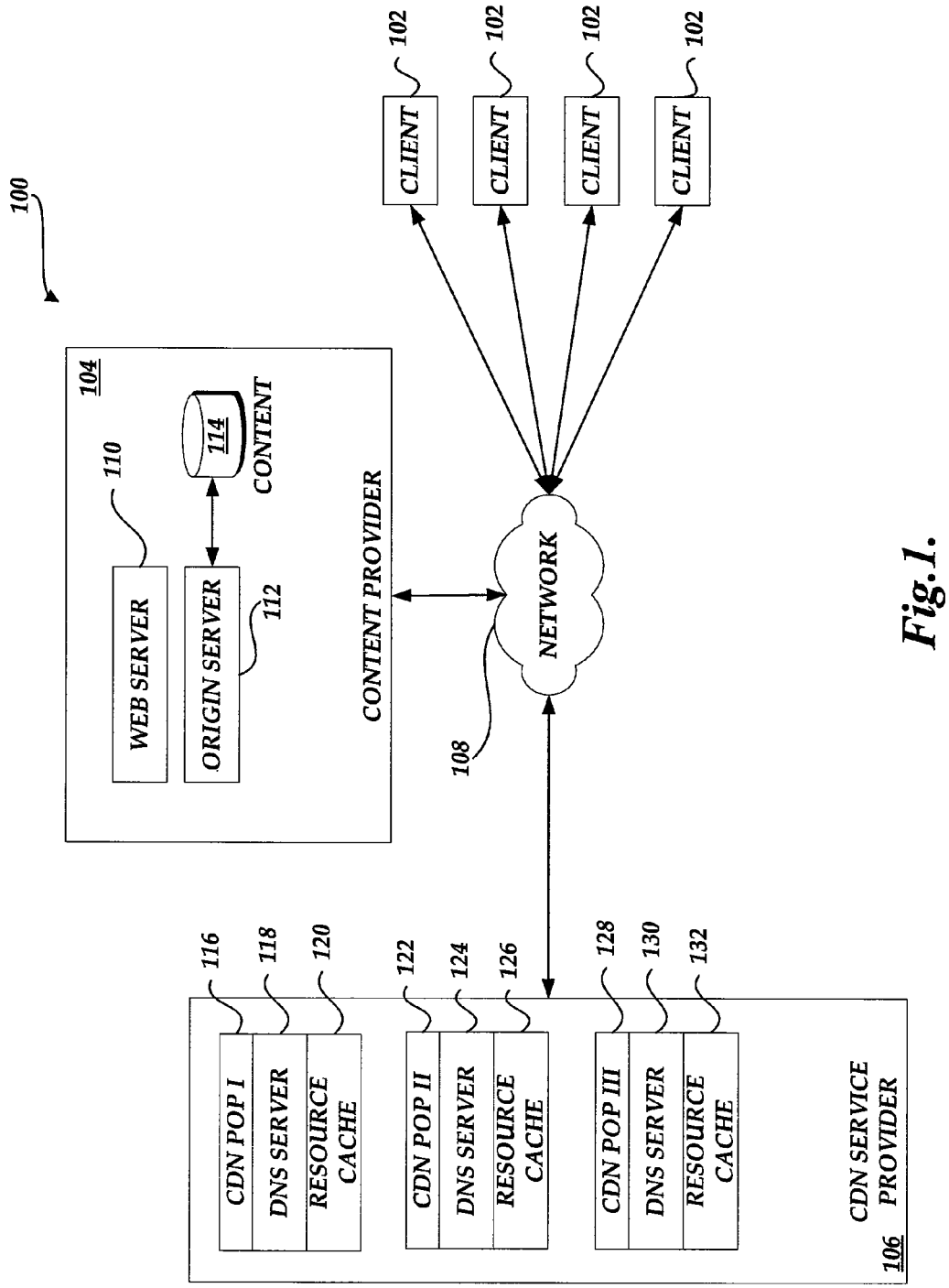
FIG. 1 is a block diagram illustrative of a content delivery environment including a number of client computing devices, a content provider, and a content delivery network service provider.

FIG. 1 is a block diagram illustrative of content delivery environment 100 for the management and processing of content requests. As illustrated in FIG. 1, the content delivery environment 100 includes a number of client computing devices 102 (generally referred to as clients) for requesting content from a content provider, a CDN service provider, or other service provider. In an illustrative embodiment, the client computing devices 102 can correspond to a wide variety of computing devices, including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 can utilize some type of local DNS resolver component, such as a DNS Name server, that generates the DNS queries attributed to the client computing device 102. In one embodiment, the local DNS resolver component may be provided by an enterprise network to which the client computing device 102 belongs. In another embodiment, the local DNS resolver component may be provided by an Internet Service Provider ("ISP") that provides the communication network connection to the client computing device 102. However, for purposes of the present disclosure, communications facilitated through a network component, such as a DNS resolver component, will be illustrated as transmitted directly from the client computing devices 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102. The content provider 104 can further include an origin server component 112 and associated storage component 114 corresponding to one or more computing devices for obtaining and processing requests for network resources from the CDN service provider. One skilled in the relevant art will appreciate that the content provider 104 can be associated with various additional computing resources, such as additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the content delivery environment 100 can further include a CDN service provider 106 in communication with the one or more client computing devices 102 and the content provider 104 via the communication network 108. The CDN service provider 106 illustrated in FIG. 1 corresponds to a logical association of one or more computing devices associated with a CDN service provider. Specifically, the CDN service provider 106 can include a number of POP locations 116, 122, 128 that correspond to nodes on the communication network 108. Each POP 116, 122, 128 includes a DNS component 118, 124, 130 made up of a number of DNS server computing devices for resolving DNS queries from the client computing devices 102. Each POP 116, 122, 128 also includes a resource cache component 120, 126, 132 made up of a number of cache server computing devices for storing resources from content providers and transmitting various requested resources to various client computers. The DNS components 118, 124 and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the POPs 116, 122, 128 are illustrated in FIG. 1 as logically associated with the CDN service provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like.

With reference now to FIGS. 2-7, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
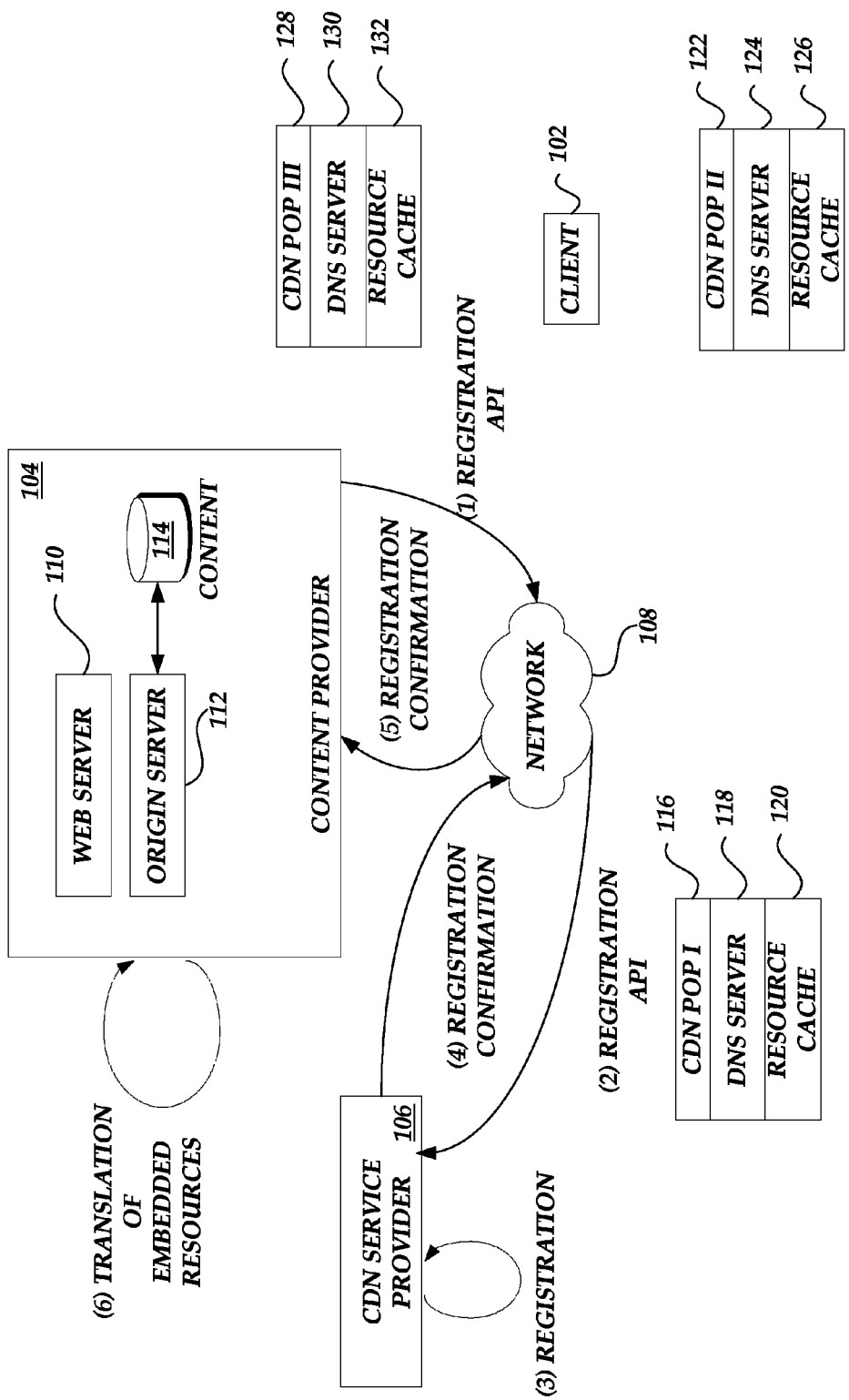
FIG. 2 is a block diagram of the content delivery environment of FIG. 1 illustrating the registration of a content provider with a content delivery service provider.

With reference to FIG. 2, an illustrative interaction for registration of a content provider 104 with the CDN service provider 106 will be described. As illustrated in FIG. 2, the CDN content registration process begins with registration of the content provider 104 with the CDN service provider 106. In an illustrative embodiment, the content provider 104 utilizes a registration application program interface ("API") to register with the CDN service provider 106 such that the CDN service provider 106 can provide content on behalf of the content provider 104. The registration API includes the identification of the origin server 112 of the content provider 104 that will provide requested resources to the CDN service provider 106.

One skilled in the relevant art will appreciate that upon identification of appropriate origin servers 112, the content provider 104 can begin to direct requests for content from client computing devices 102 to the CDN service provider 106. Specifically, in accordance with DNS routing principles, a client computing device request corresponding to a resource identifier would eventually be directed toward a POP 116, 122, 128 associated with the CDN service provider 106. In the event that the resource cache component 120, 126, 132 of a selected POP does not have a copy of a resource requested by a client computing device 102, the resource cache component will request the resource from the origin server 112 previously registered by the content provider 104.

With continued reference to FIG. 2, upon receiving the registration API, the CDN service provider 106 obtains and processes the registration information. In an illustrative embodiment, the CDN service provider 106 can then generate additional information that will be used by the client computing devices 102 as part of the content requests. The additional information can include, without limitation, client identifiers, such as client identification codes, content provider identifiers, such as content provider identification codes, executable code for processing resource identifiers, such as script-based instructions, and the like. One skilled in the relevant art will appreciate that various types of additional information may be generated by the CDN service provider 106 and that the additional information may be embodied in any one of a variety of formats.

Illustratively, the CDN service provider 106 returns an identification of applicable domains for the CDN service provider (unless it has been previously provided) and any additional information to the content provider 104. In turn, the content provider 104 can then process the stored content with content provider specific information. In one example, as illustrated in FIG. 2, the content provider 104 translates resource identifiers originally directed toward a domain of the origin server 112 to a domain corresponding to the CDN service provider. The translated URLs are embedded into requested content in a manner such that DNS queries for the translated URLs will resolve to a DNS server corresponding to the CDN service provider 106 and not a DNS server corresponding to the content provider 104. Although the translation process is illustrated in FIG. 2, in some embodiments, the translation process may be omitted in a manner described in greater detail below.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process, the content provider URL is modified such that requests for the resources associated with the translated URLs resolve to a POP associated with the CDN service provider 106. In one embodiment, the translated URL identifies the domain of the CDN service provider 106 (e.g., "cdnprovider.com"), the same name of the resource to be requested (e.g., "resource.xxx") and the same path where the resource will be found (e.g., "path"). Additionally, the translated URL can include additional processing information (e.g., "additional information"). The translated URL would have the form of:

http://additional_information.cdnprovider.com/path/resources.xxx

Figure 3:
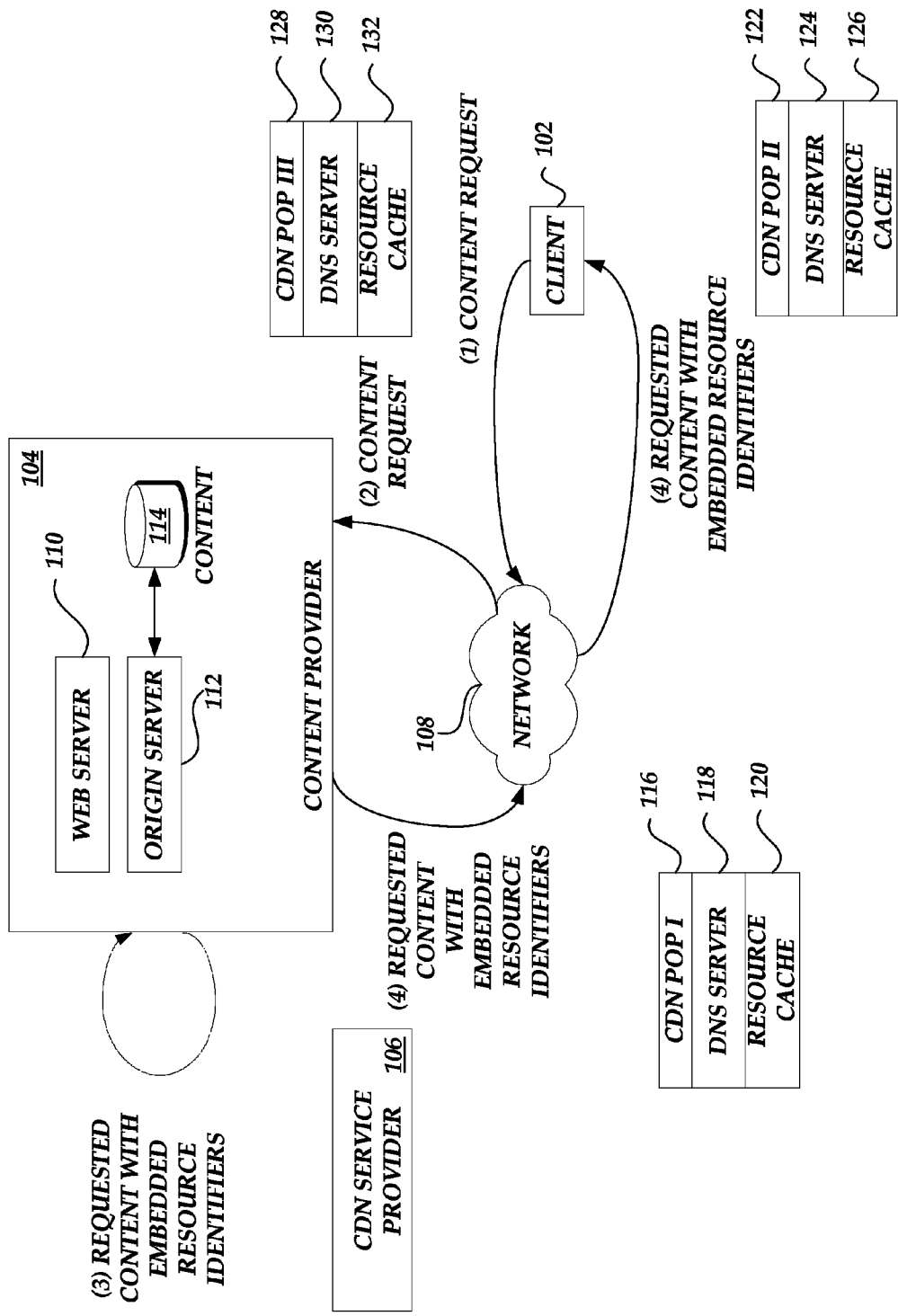
FIG. 3 is a block diagram of the content delivery environment of FIG. 1 illustrating the generation and processing of a content request from a client computing device to a content provider.

In another embodiment, the information associated with the CDN service provider 106 is included in the modified URL, such as through prepending or other techniques, such that the translated URL can maintain all of the information associated with the original URL. In this embodiment, the translated URL would have the form of:

http://additional_information.cdnprovider.com/www.contentprovider.com/path/resource.xxx With reference now to FIG. 3, after completion of the registration and translation processes illustrated in FIG. 2, a client computing device 102 subsequently generates a content request that is received and processed by the content provider 104, such as through the Web server 110. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that correspond to resource objects that should be obtained by the client computing device 102 as part of the processing of the requested content. The embedded resource identifiers can be generally referred to as original resource identifiers or original URLs regardless of whether they have been translated in the manner described above.

Upon receipt of the requested content, the client computing device 102, such as through a browser software application, begins processing any of the markup code included in the content and attempts to acquire the resources identified by the embedded resource identifiers. Accordingly, the first step in acquiring the content corresponds to the issuance, by the client computing device 102 (through its local DNS resolver), a DNS query for the original URL resource identifier that results in the identification of a DNS server authoritative to the "." and the "com" portions of the translated URL. After resolving the "." and "com" portions of the embedded URL, the client computing device 102 then issues a DNS query for the resource URL that results in the identification of a DNS server authoritative to the ".cdnprovider" portion of the embedded URL. The issuance of DNS queries corresponding to the "." and the "com" portions of a URL are well known and have not been illustrated.

Figure 4:
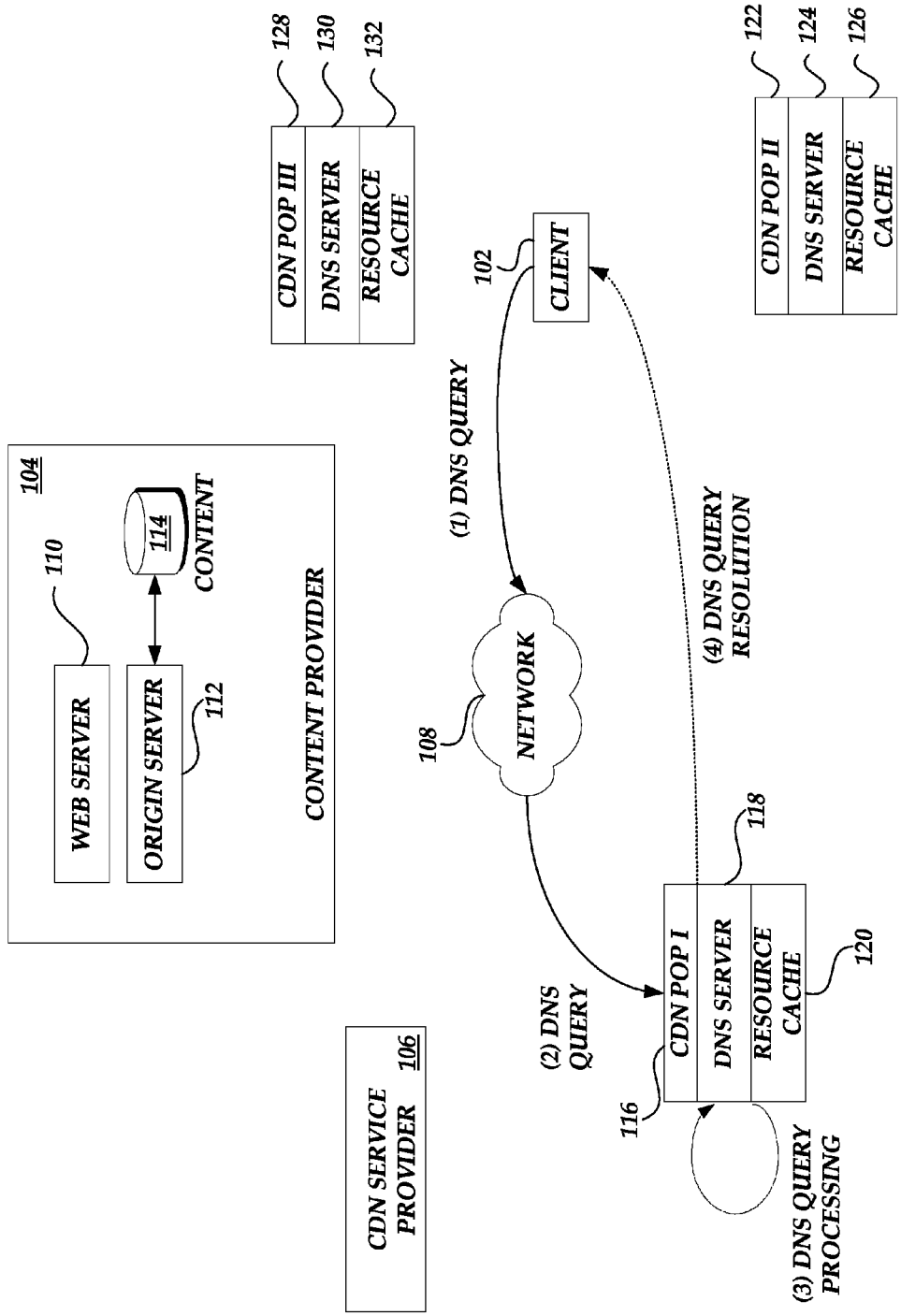
FIG. 4 is a block diagram of the content delivery environment of FIG. 1 illustrating the generation and processing of a DNS query corresponding to an embedded resource from a client computing device to a content delivery network service provider.

With reference now to FIG. 4, in an illustrative embodiment, the successful resolution of the "cdnprovider" portion or "contentprovider" portion of the original URL identifies a network address, such as an IP address, of a DNS server associated with the CDN service provider 106. In one embodiment, the IP address is a specific network address unique to a DNS server component of a POP. In another embodiment, the IP address can be shared by one or more POPs. In this embodiment, a further DNS query to the shared IP address utilizes a one-to-many network routing schema, such as anycast, such that a specific POP will receive the request as a function of network topology. For example, in an anycast implementation, a DNS query issued by a client computing device 102 to a shared IP address will arrive at a DNS server component logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a POP.

With continued reference to FIG. 4, in either of the above identified embodiments (or any other embodiment), a specific DNS server in the DNS component 118 of a POP 116 receives the DNS query transmitted by the client computing device 102 and corresponding to the original URL of the embedded resource identifier. Once one of the DNS servers in the DNS component 118 receives the request, the specific DNS server attempts to resolve the request. Generally, a specific DNS server can resolve the DNS query by identifying an IP address of a cache server component that will process the request for the requested resource. As described above, a selected resource cache component can process the request by either providing the requested resource if it is available or attempting to obtain the requested resource from another source, such as a peer cache server computing device or the origin server 112 of the content provider 104.

In one embodiment, the DNS server resolves the DNS query by providing the IP address of a default resource cache component associated with the receiving DNS server, such as the resource cache component located at the same POP. In this embodiment, the CDN service provider 106 illustratively has utilized logic in the selection of the receiving DNS server component. In another embodiment, the receiving DNS server component can utilize additional or alternative logic in selecting resource cache components associated with various POPs provided by the CDN service provider 106. In this embodiment, the example routines for the selection of alternative DNS servers illustrated in FIGS. 8-10 could be applied in the selection of a resource cache component.

Figure 5:
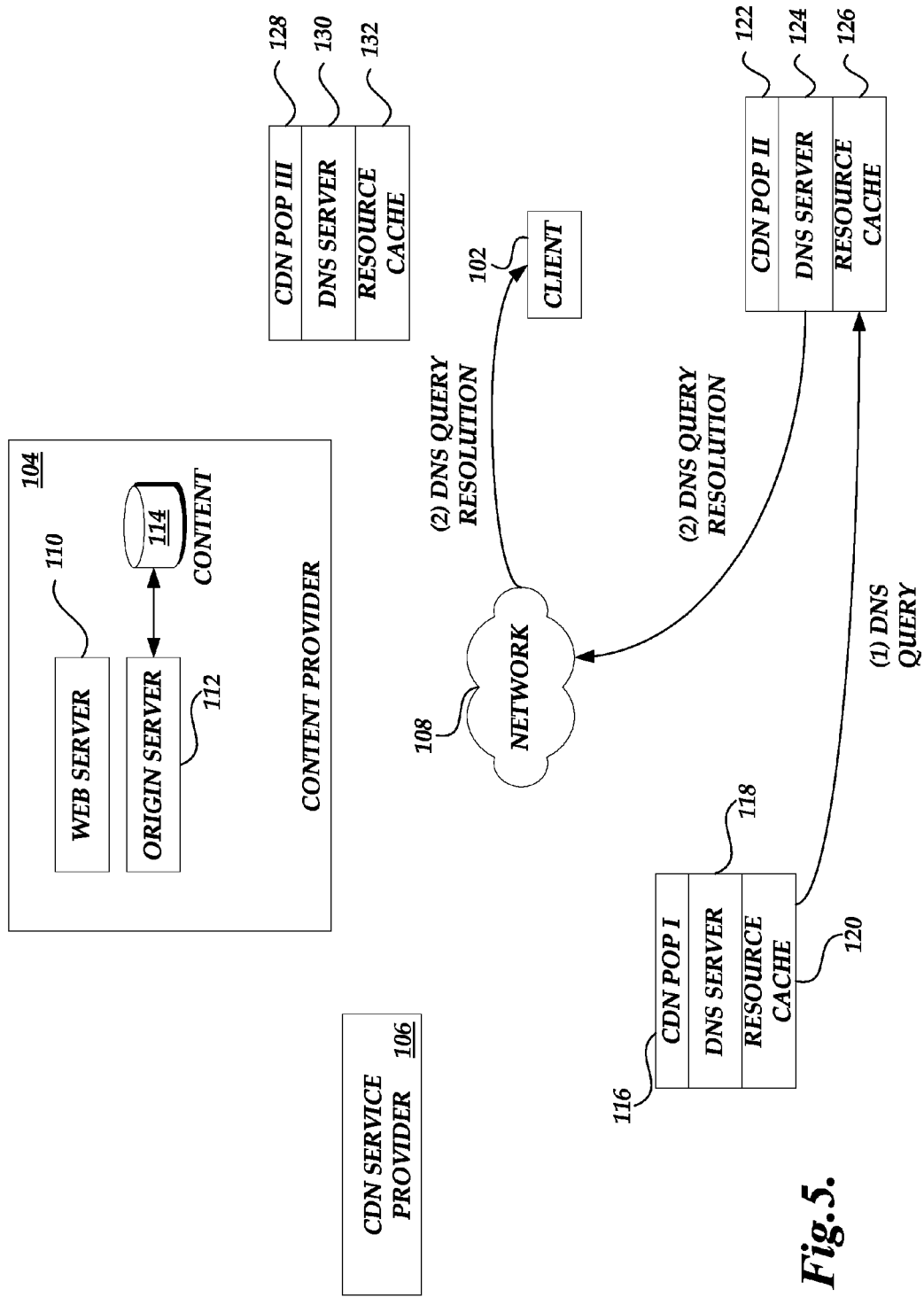
FIG. 5 is a block diagram of the content delivery environment of FIG. 1 illustrating the forwarding of a DNS query to an alternative DNS server component.
Figure 6:
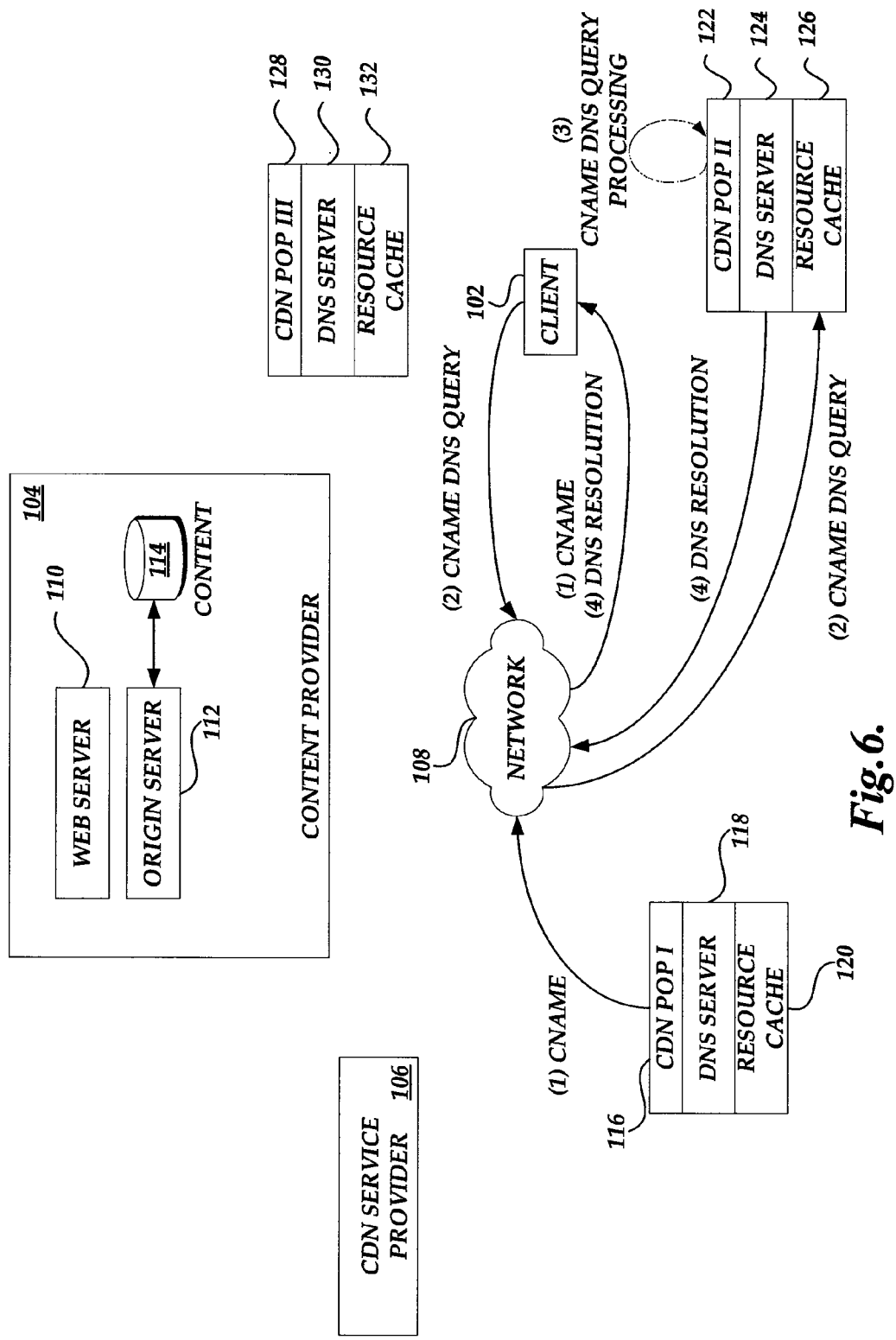
FIG. 6 is a block diagram of the content delivery environment of FIG. 1 illustrating the generation and processing of a DNS query with alternative resource identifiers.

Referring now to FIGS. 5 and 6, if the receiving DNS server is not capable of resolving the DNS query (e.g., the receiving DNS server is not authoritative) or if CDN service provider 106 determines that another DNS server at another POP should resolve the DNS server, the specific receiving DNS server will cause the DNS query to be received by another DNS server. Example routines for the selection of alternative DNS query will be described with regard to FIGS. 8-10. As will be explained in greater detail below, the routing of a received DNS query to an alternative DNS server component can be achieved in various manners and can be implemented independently of any additional logic in the identification of one or more resource cache components (e.g., resolution of the DNS query) or in conjunction with additional or alternative logic utilized in the identification of one or more resource cache components.

With reference to FIG. 5, in one alternative embodiment for causing the receipt of a DNS query by another DNS server, the receiving DNS server can process additional information included in an original URL DNS query and utilize logic to select an alternative DNS server provided by the CDN service provider 106 or another service provider. With reference to the previous illustrative original URL format, the receiving DNS server can parse the "additional information" included in the URL corresponding to the DNS query and apply various request routing criteria to identify one or more DNS server best suited to attempt to resolve the DNS query. For example, the additional information included in the URL can identify service plan information, geographic identifiers, account identifiers or other information utilized by the receiving DNS server to select an appropriate alternative DNS server. Example routines for the selection of alternative DNS servers will be discussed in greater detail below. As illustrated in FIG. 5, the receiving DNS server, such as a specific DNS server in the DNS component 118 of a POP 116, would forward the received DNS query to the DNS component 124 of POP 122. In this embodiment, the forwarding of the DNS query to an alternative POP may be achieved without additional interaction between the receiving DNS component 118 and the requesting client computing device.

With reference now to FIG. 6, in another alternative embodiment for causing the receipt of a DNS query by another DNS server, the CDN service provider 106 can maintain sets of various alternative resource identifiers that cause the client computing device 102 to transmit one or more subsequent DNS queries. The alternative resource identifiers can be provided by the CDN service provider 106 to the client computing device 102 such that a subsequent DNS query on the alternative resource identifier will resolve to a different DNS server component within the CDN service provider's network. In an illustrative embodiment, the alternative resource identifiers are in the form of one or more canonical name ("CNAME") records. In one embodiment, each CNAME record identifies a domain of the CDN service provider 106 (e.g., "cdnprovider.com" or "cdnprovider-1.com"). As will be explained in greater detail below, the domain in the CNAME does not need to be the same domain found in original URL or in a previous CNAME record. Additionally, each CNAME record includes additional information, such as request routing information, (e.g., "request routing information"). An illustrative CNAME record can have the form of:

CNAME request_routing_information.cdnprovider.com

In accordance with an illustrative embodiment utilizing CNAMES, the DNS server maintains a data store that defines CNAME records for various original URLs. If a DNS query corresponding to a particular original URL matches an entry in the data store, the DNS server component 118 returns a CNAME record as defined in the data store. In an illustrative embodiment, the data store can include multiple CNAME records corresponding to a particular original URL. The multiple CNAME records would define a set of potential candidates that can be returned to the client computing device. In such an embodiment, the DNS server component 118, either directly or via a network-based service, can implement additional logic in selecting an appropriate CNAME from a set of possible of CNAMEs. In an illustrative embodiment, each DNS server component 118, 124, 130 maintains the same data stores that define CNAME records, which can be managed centrally by the CDN service provider 106. Alternatively, each DNS server component 118, 124, 130 can have a POP specific data stores that define CNAME records, which can be managed centrally by the CDN service provider 106 or locally at the POP 116, 122, 128.

The returned CNAME can also include request routing information that is different from or in addition to the information provided in URL/CNAME of the current DNS query. For example, if the CNAME selection is based on regional plan, a specific regional plan can be identified in the "request routing information" portion of the specific CNAME record. A similar approach could be taken to identify service level plans and file management by including a specific identifier in the "request routing information" portion of the CNAME record. In another embodiment, request routing information can be found in the identification of a CDN service provider 106 domain different from the domain found in the current URL/CNAME. For example, if the CNAME is based on regional plan, a specific regional plan domain (e.g., "cdn-provder-region1.com") could be used in the domain name portion of the specific CNAME record. Any additional request routing information can be prepended to the existing request routing information in the current URL/CNAME such that the previous request routing information would not be lost (e.g., CNAME serviceplan.regionalplan.cdn-provider.com). One skilled in the relevant art will appreciate that additional or alternative techniques and/or combination of techniques may be used to include the additional request routing information in the CNAME record that is selected by the DNS server component 118.

One skilled in the relevant art will appreciate that DNS server component 118 may select (or otherwise obtain) a CNAME record that is intended resolve to a more appropriate DNS server of the CDN service provider 106. It may be possible, however, that the same DNS server would also be authoritative for the subsequent DNS query for the CNAME to be provided to the client computing device. In such an embodiment, the DNS server, such as DNS server component 118, may choose to resolve the future DNS query in advance.

With continued reference to FIG. 6, upon receipt of the CNAME from the DNS server component 118, the client computing device 102 generates a subsequent DNS query corresponding to the CNAME. As previously discussed with regard to FIG. 4, the DNS query process could first start with DNS queries for the "." and "com" portions, followed by a query for the "cdnprovider" portion of the CNAME. To the extent, however, that the results of a previous DNS queries can be cached (and remain valid), the client computing device 102 can utilize the cached information and does not need to repeat the entire process. However, at some point, depending on whether the CNAME provided by DNS server component 118 and the previous URL/CNAME share common CDN service provider domains, the DNS query resolves to a different POP provided by the CDN service provider 106. As illustrated in FIG. 6, the DNS server component 124 of POP 122 is now authoritative based on the different information in the current CNAME previously provided by the DNS server component 118. As previously described, the DNS server component 124 can then determine whether to resolve the DNS query on the CNAME with an IP address of a cache component that will process the content request or whether to provide another alternative resource identifier selected in the manner described above.

In an illustrative embodiment, the receiving DNS server components, such as DNS server component 130, can utilize a variety of information in selecting a resource cache component. In one example, the DNS server component can default to a selection of a resource cache component of the same POP. In another example, the DNS server components can select a resource cache component based on various load balancing or load sharing algorithms. Still further, the DNS server components can utilize network performance metrics or measurements to assign specific resource cache components. The IP address selected by a DNS server component may correspond to a specific caching server in the resource cache. Alternatively, the IP address can correspond to a hardware/software selection component (such as a load balancer).

Figure 7:
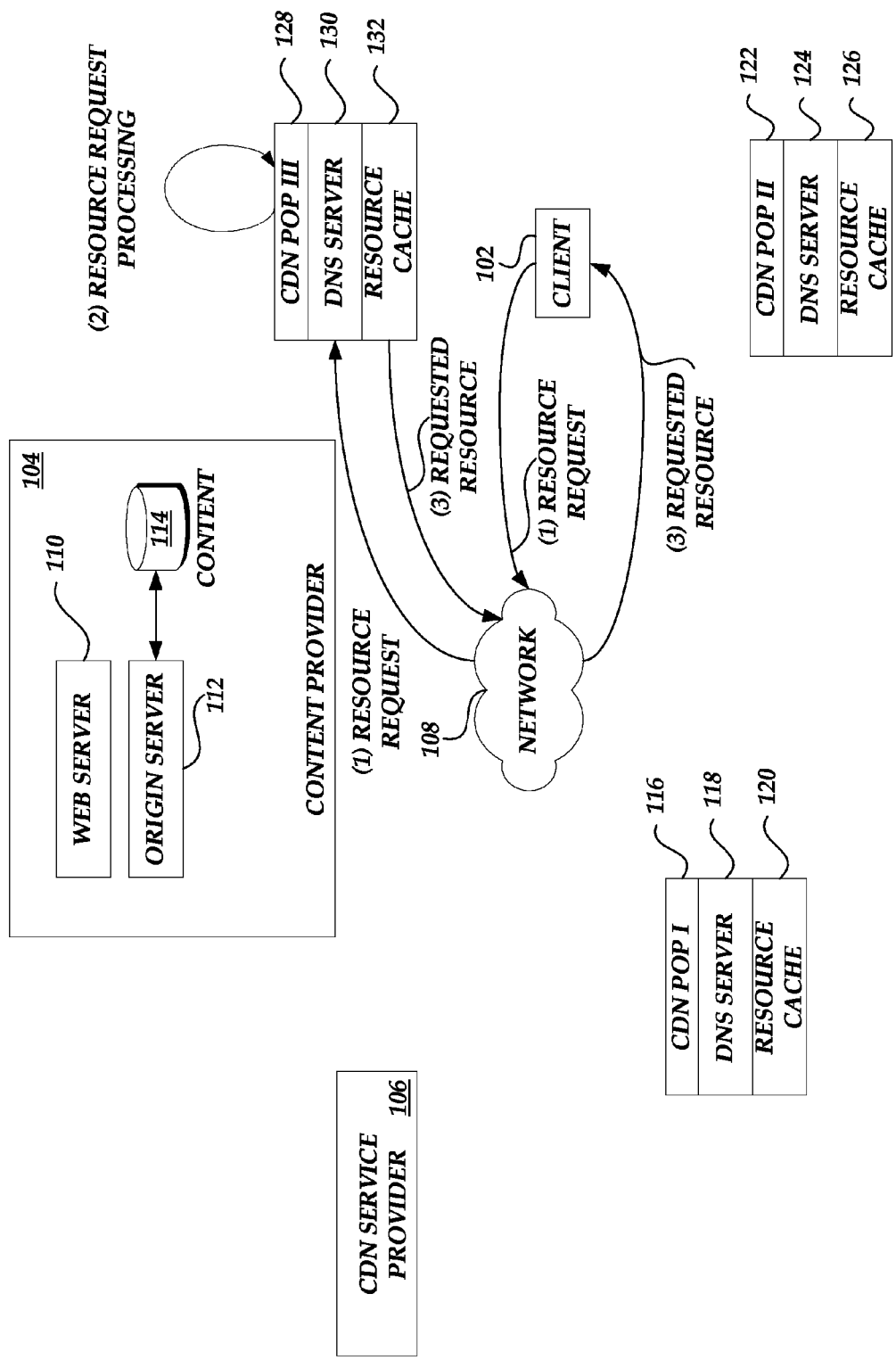
FIG. 7 is a block diagram of the content delivery environment of FIG. 1 illustrating the generation and processing of embedded resource requests from a client computing device to a content delivery network service provider.

With reference now to FIG. 7, in an illustrative example, assuming in the various embodiments described with regard to FIGS. 4, 5 and 6 that a receiving DNS server component has resolved a DNS query and identified the IP address of a resource cache component for providing the requested resource, upon receipt of the IP address for the resource cache component 132, the client computing device 102 transmits requests for the requested content to the resource cache component 132. The resource cache component 132 processes the request in a manner described above and the requested content is transmitted to the client computing device 102.

Figure 8:
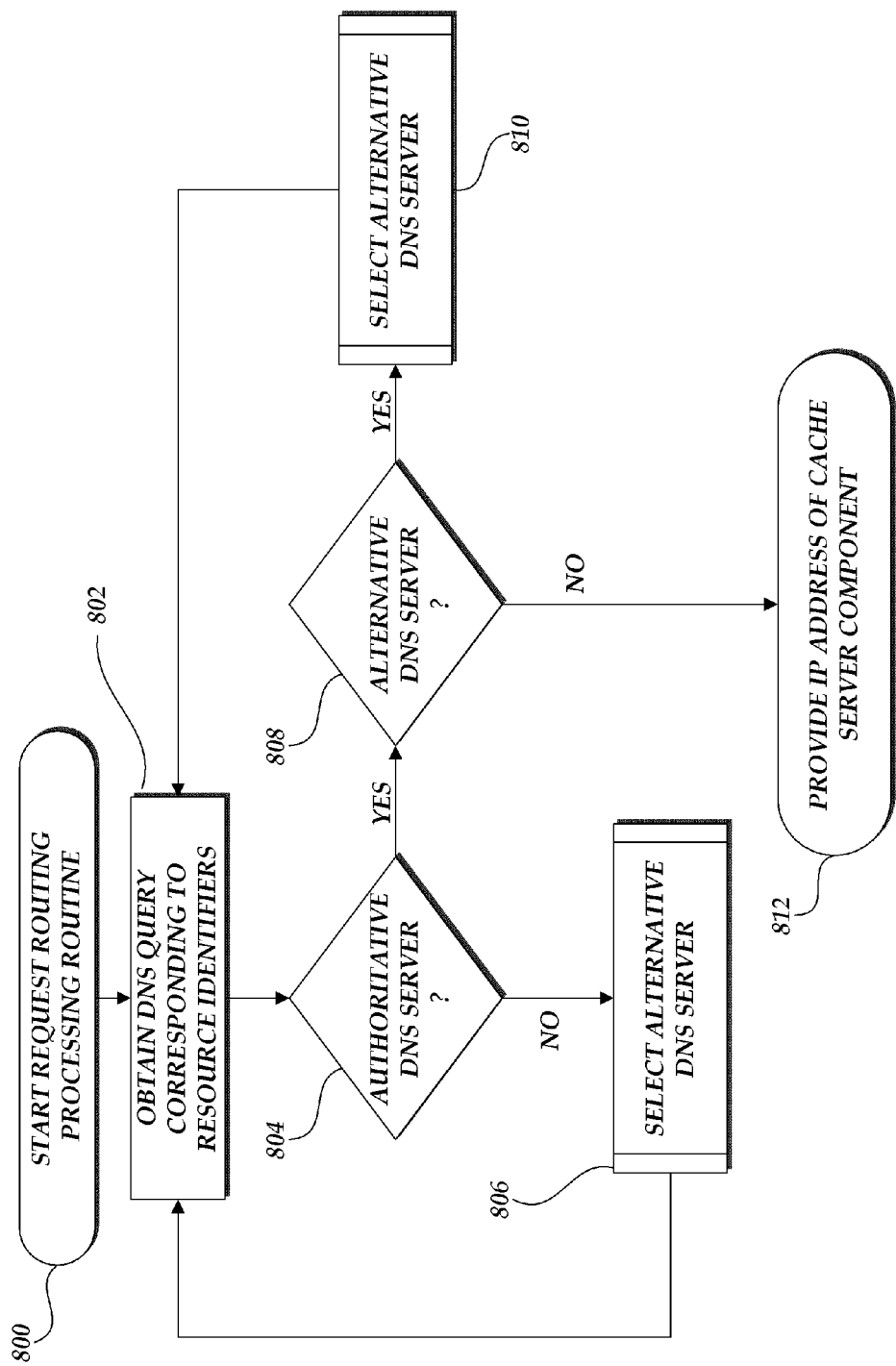
FIG. 8 is a flow diagram illustrative of a request routing routine implemented by a content delivery network service provider utilization of a series of alternative resource identifiers.

With reference now to FIG. 8, a request routine 800 implemented by the CDN service provider 106 will be described. One skilled in the relevant art will appreciate that actions/steps outlined for routine 800 may be implemented by one or many computing devices/components that are associated with the CDN service provider 106. Accordingly, routine 800 has been logically associated as being performed by the CDN service provider 106.

At block 802, one of the DNS server components 118, 124, 130 receives a DNS query corresponding to resource identifier. As previously discussed, the resource identifier can be a URL that has been embedded in content requested by the client computing device 102 and previously provided by the content provider 104. Alternatively, the resource identifier can also correspond to a CNAME provided by a content provider DNS server in response to a DNS query previously received from the client computing device 102. At decision block 804, a test is conducted to determine whether the current DNS server is authoritative to resolve the DNS query. In an illustrative embodiment, the DNS server can determine whether it is authoritative to resolve the DNS query if there are no CNAME records corresponding to the received resource identifier. In another embodiment, the DNS server can parse any additional information included in the URL corresponding to the DNS query and utilize the additional information to determine whether the receiving DNS server component is authoritative. For example, the additional information in the URL may include information, such as an identifier, that identifies the authoritative DNS server. Alternative or additional methodologies may also be practiced to determine whether the DNS server is authoritative.

If at decision block 804 the DNS server is not authoritative, at block 806, the DNS server component selects an alternative DNS server. As described above, in one embodiment, the receiving DNS server can select an alternative DNS server by utilizing an alternative resource identifier, such as a CNAME. In this embodiment, the receiving DNS server component can utilize a data store to identify an appropriate CNAME as a function of the current DNS query. Additionally, the DNS server component can also implement additional logical processing to select from a set of potential CNAMEs. In another embodiment, the receiving DNS server can forward the DNS query via the communication network to another DNS server component. Two example sub-routines for selection of the alternative DNS server will be described with regard to FIGS. 9 and 10. The routine 800 returns to block 802 where another DNS server component of the CDN service provider 106 receives the forwarded DNS query or a subsequent DNS query corresponding to a returned CNAME.

With reference again to block 804, if the receiving DNS server is authoritative (including a determination that the same DNS server will be authoritative for subsequent DNS queries), then at decision block 808, the receiving DNS server component determines whether any alternative DNS server should be selected.

In one embodiment, a receiving DNS server component may be authoritative because it can resolve the DNS query. However, the CDN service provider 106 may wish to have another authoritative server resolve the request. For example, the CDN service provider 106 may wish to balance the request requests among several DNS servers. In another example, the CDN service provider 106 may wish to test the performance of the DNS server component associated with other POPs in the CDN service providers domain. If the DNS server component is determined to select an alternative server, at block 810, the receiving DNS server selects an alternative DNS servers. As described above, in one embodiment, the receiving DNS server can select an alternative DNS server by utilizing an alternative resource identifier, such as a CNAME. In this embodiment, the receiving DNS server component can utilize a data store to identify an appropriate CNAME as a function of the current DNS query. Additionally, the DNS server component can also implement additional logical processing to select from a set of potential CNAMEs. In another embodiment, the receiving DNS server can forward the DNS query via the communication network to another DNS sever component. Two example sub-routines for selection of the alternative DNS server will be described with regard to FIGS. 9 and 10. The routine 800 returns to block 802 where another DNS server component of the CDN service provider 106 receives the forwarded DNS query or a subsequent DNS query corresponding to a returned CNAME.

Referring again to decision block 808, if the receiving DNS server does not select an alternative server, the current DNS server resolves the DNS query by returning the IP address of cache server component. In a non-limiting manner, a number of methodologies for selecting an appropriate resource cache component have been previously discussed. For example, the receiving DNS server can implement the logic described in selecting the alternative DNS servers in FIGS. 9 and 10 to select a resource cache component. In another example, the receiving DNS server can select a default resource cache component, such as the resource cache component associated with the POP of the receiving DNS server. Additionally, as described above, the IP address may correspond to a specific cache server of a resource cache component or generally to a group of cache servers.

Figure 9:
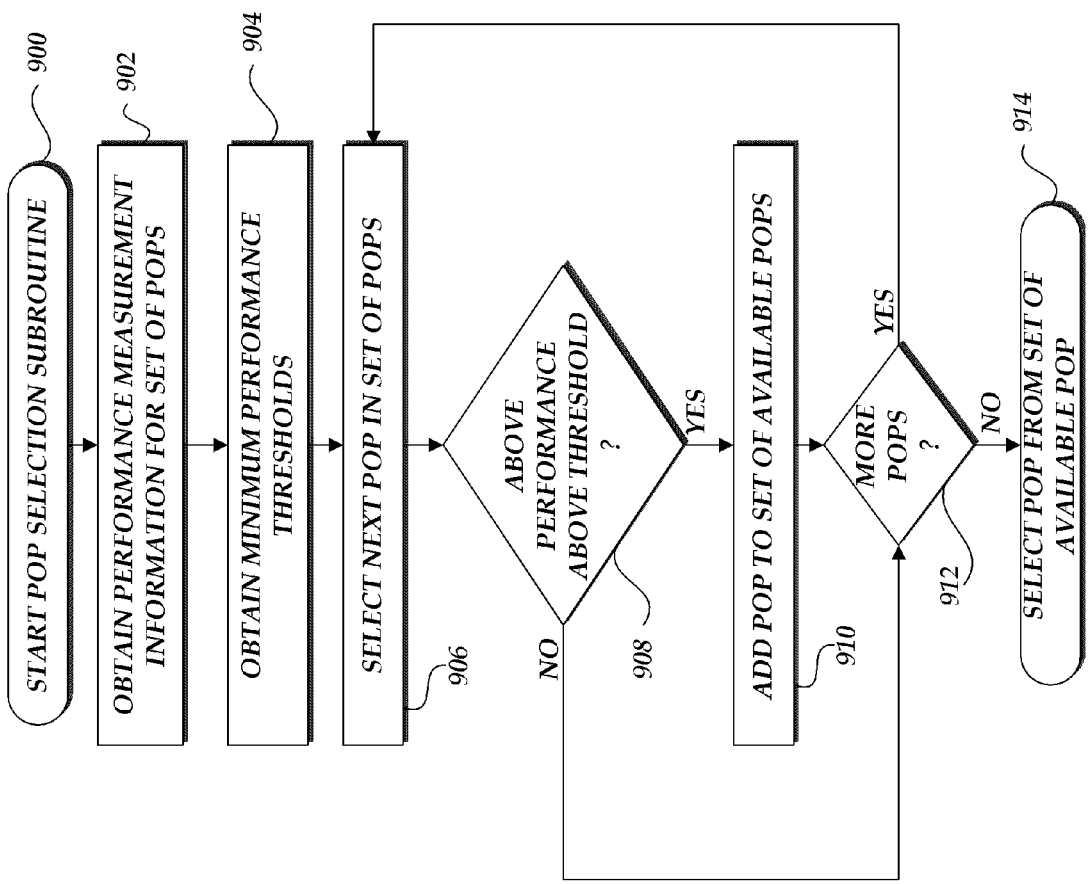
FIG. 9 is a flow diagram illustrative of a Point of Presence selection sub-routine implemented by a content delivery network service provider.

Referring now to FIG. 9, a flow diagram illustrative of a Point of Presence selection sub-routine 900 based on a minimum performance threshold and implemented by the CDN service provider 106 will be described. One skilled in the relevant art will appreciate that actions/steps outlined for sub-routine 900 may be implemented by one or many computing devices/components that are associated with the CDN service provider 106. Accordingly, sub-routine 900 has been logically associated as being performed by the CDN service provider 106. Additionally, as described above, although sub-routine 900 will be described with regard to the selection of alternative DNS server components, sub-routine 900 may be implemented by a DNS server in the selection of resource cache components in resolving a DNS query.

At block 902, the DNS server obtains performance measurement information for a set of target POPs in the CDN service provider domain. In an illustrative embodiment, the set of target POPs can correspond to all the POPs within a CDN service provider 106 domain or a subset of POPs identified by other criteria, such as service level plans, geographic limitations, and the like. Illustratively, the performance measurement information corresponds to at least one value or category related to the delivery of resources. In one embodiment, the performance measurement information can correspond to values related to latency measurement information for providing resources. The latency information can be associated with the requesting client computing device 102, such as latency information from previous interactions with the specific client computing device. The latency information can also be associated with groupings of client computing devices 102, such as by ISP, geographic location, enterprise networks, DNS resolver components, and the like. Additionally, the latency information may be determined based on absolute latency measurements or relative latency measurements.

In another embodiment, the performance measurement information can correspond to categories, or levels, of performance as determined by the CDN service provider 106, ISPs, client computing devices 102 or other entity. For example, the performance measurement information can correspond to a classification of a POP according to a category (e.g., "gold" or "silver") based on historical information. The category information may be measured in terms of absolute performance or relative performance according to other POPs. Still further, the category information may also be organized in accordance with other criteria, such as geographic organizational criteria, network affiliation organizational criteria, organization affiliation organizational criteria, and the like. One skilled in the relevant art will appreciate that additional or alternative performance measurement information may also be utilized or combined.

At block 904, the DNS server obtains minimum performance thresholds for selecting a POP. The performance threshold or set of performance thresholds will correspond to the performance information obtained in block 902. The performance threshold information may be maintained centrally by the CDN service provider 106 or managed individually at each POP (or by a set of POPs). At block 906, the sub-routine 900 proceeds to a loop by selecting the next POP in the set of POPs available to process the DNS query. At decision block 908, a test is conducted to determine whether the performance information associated with the currently selected POP is above the performance threshold. If so, the POP is added to a set of POPs available for selection at block 910.

If at decision block 908, the performance measurement information is not above the performance threshold, or once a POP has been added to the set of POPs available for selection, at decision block 912, a test is conducted to determine whether there are additional POPs in the original set of POPs. If so, the sub-routine 900 returns to block 906 for processing of the performance measurement information for the next POP in the original set of POPs. Alternatively, if no additional POPs remain in the original set of POPs, the sub-routine 900 returns with the selection of POP from the set of available POPs. In one embodiment, the POP selection can be based on a relative comparison of performance measurement information (e.g., the POP associated with the lowest latency). In another embodiment, the POP selection can be based on random selection or a weighted selection based on performance measurement information. In still another embodiment, additional criteria, such as geographic criteria, cost criteria, etc. may be utilized to select a POP from the set of available POPs.

Figure 10:
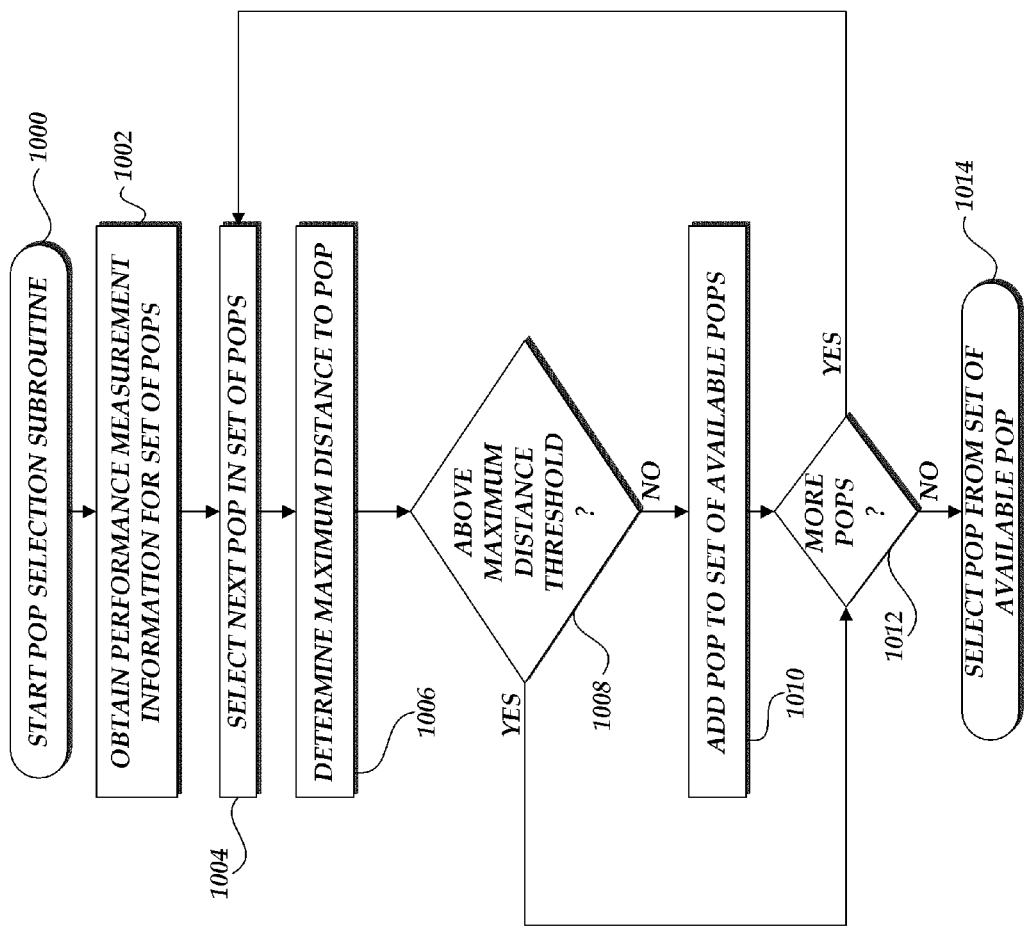
FIG. 10 is a flow diagram illustrative of a Point of Presence selection sub-routine implemented by a content delivery network service provider.

Referring now to FIG. 10, a flow diagram illustrative of a Point of Presence selection sub-routine 1000 based on approximated geographic distance and implemented by the CDN service provider 106 will be described. One skilled in the relevant art will appreciate that actions/steps outlined for sub-routine 1000 may be implemented by one or many computing devices/components that are associated with the CDN service provider 106. Accordingly, sub-routine 1000 has been logically associated as being performed by the CDN service provider 106. Additionally, as described above, although sub-routine 1000 will be described with regard to the selection of alternative DNS server components, sub-routine 1000 may be implemented by a DNS server in the selection of resource cache components in resolving a DNS query.

At block 1002, the DNS server obtains performance measurement information for a set of target POPs in the CDN service provider domain. In an illustrative embodiment, the set of target POPs can correspond to all the POPs within a CDN service provider 106 domain or a subset of POPs identified by other criteria, such as service level plans, geographic limitations, and the like. In one embodiment, the performance measurement information can correspond to values related to latency measurement information for providing resources. The latency information can be associated with the requesting client computing device 102, such as latency information from previous interactions with the specific client computing device. The latency information can also be associated with groupings of client computing devices 102, such as by ISP, geographic location, enterprise networks, DNS resolver components, and the like. One skilled in the relevant art will appreciate that additional or alternative performance measurement information may also be utilized or combined.

At block 1004, the sub-routine 1000 proceeds to a loop by selecting the next POP in the set of POPs available to process the DNS query. At block 1006, the DNS server determines a maximum distance between the requesting client computing device (or other starting position) and the POP. In an illustrative embodiment, the maximum distance between a reference node and the POP corresponds to the product of the latency information for the reference node and the maximum speed for packet delivery. Illustratively, the reference node can correspond to a variety of network nodes or other identifiable components including, but not limited to, the client computing device 102, DNS servers, DNS resolvers, network storage location, network computing device locations, mobile terminals, mobile infrastructure equipment, and the like.

Figure 11:
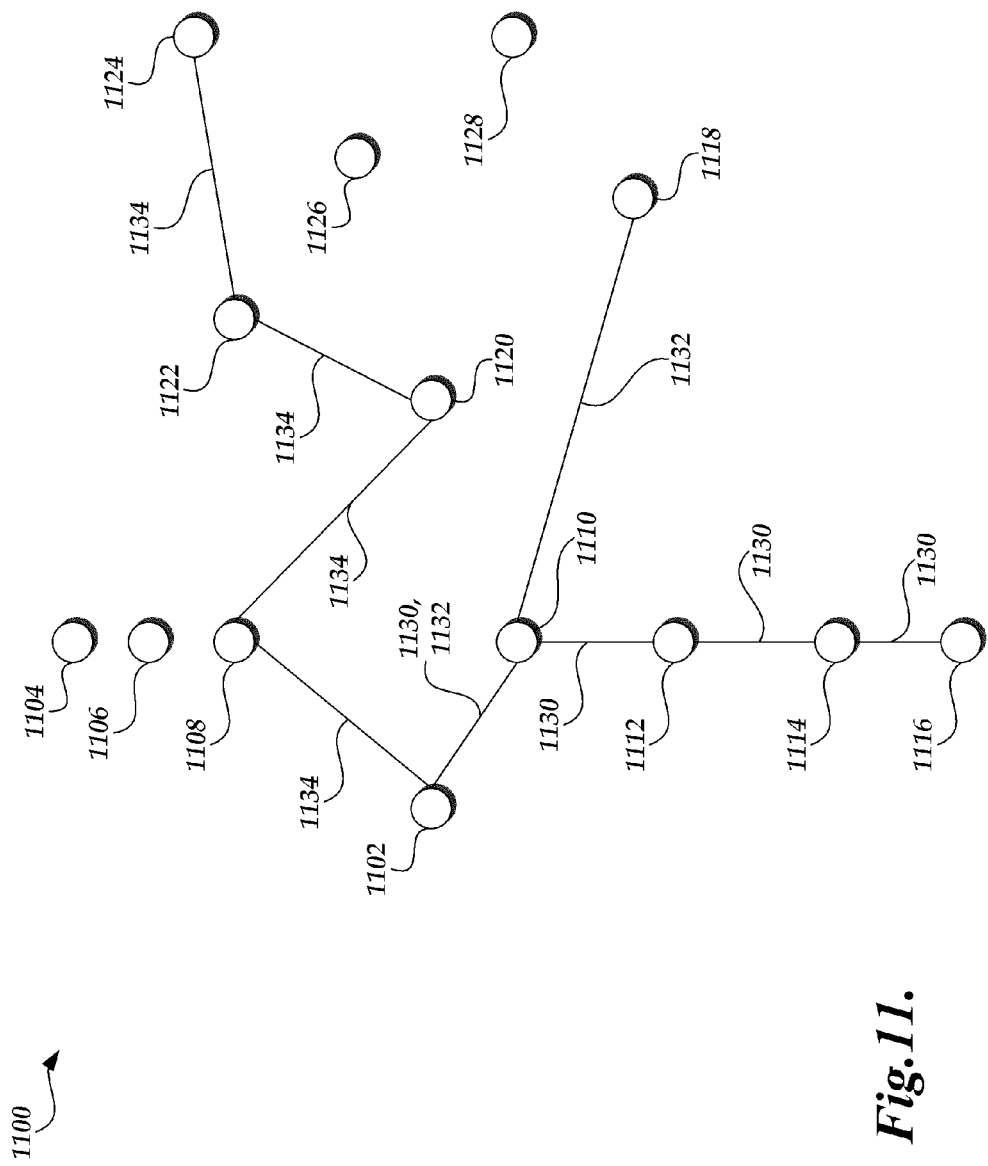
FIGS. 11-13 are block diagrams illustrative of the approximation of geographic distance of various nodes of a communication network for use in the selection of a Point of Presence location.
Figure 12:
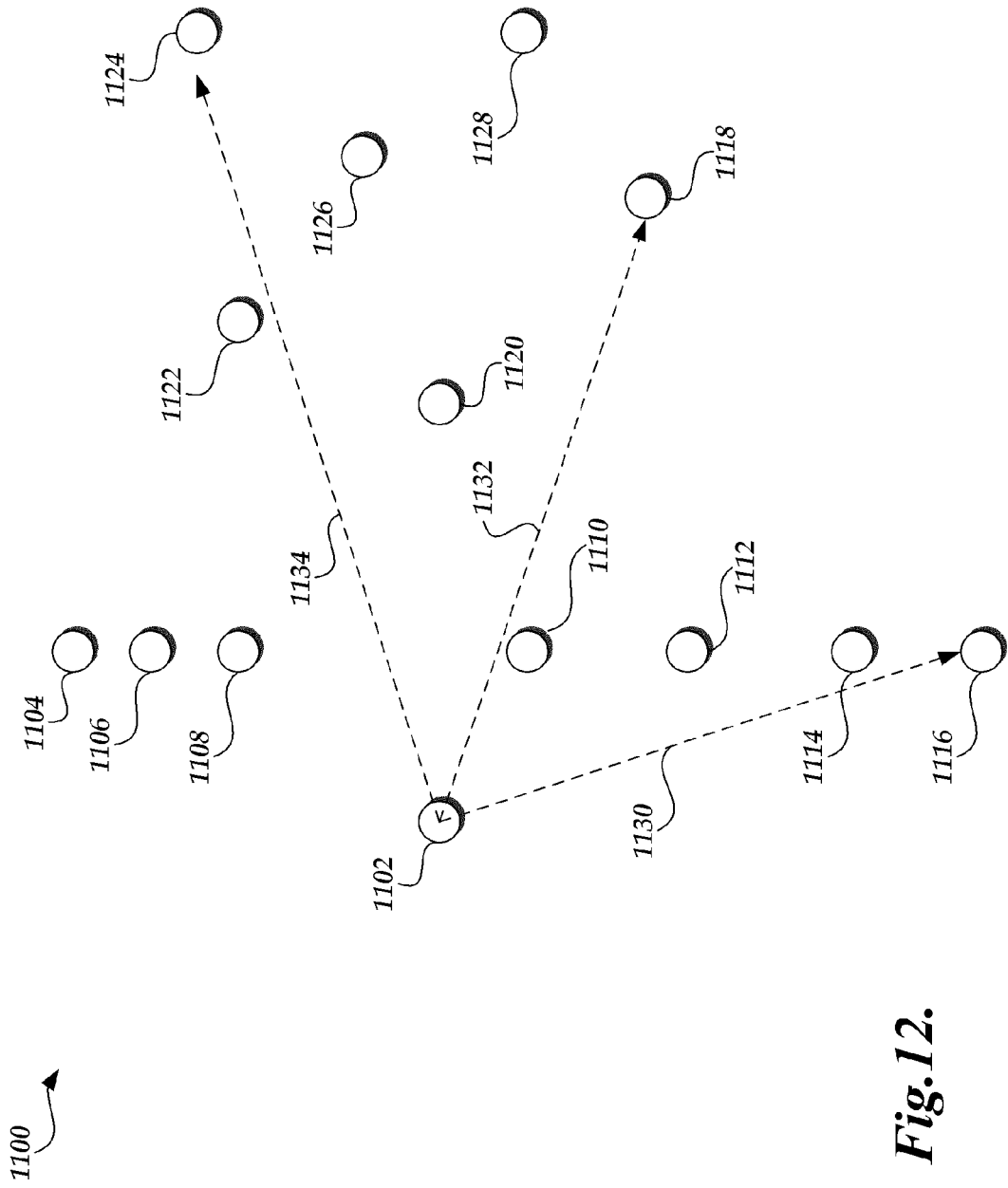

With reference to FIG. 11, assume that a portion of the communication network 108 includes a number of nodes 1102-1128. Assume that the client computing device 102 corresponds to node 1102 and that CDN service provider's domain includes POPs corresponding to nodes 1116, 1118 and 1124. As also illustrated in FIG. 11, the actual path of communications between node 1102 and 1116, path 1130, corresponds to network intermediate communications through nodes 1110, 1112 and 1114. Likewise, the actual path of communications between node 1102 and 1118, path 1134, corresponds to network intermediate communications through node 1110. Still further, the actual path of communications between node 1102 and 1124, path 1134, corresponds to network intermediate communications through nodes 1108, 1120, and 1122. With reference now to FIG. 12, it can be assumed that the maximum distance between node 1102 and nodes 1116, 1118 and 1124, respectively paths 1130, 1132 and 1134 is a straight line between the two nodes, the distance of which is the product of the latency in communications and the maximum speed of communications (e.g., the speed of light). In this embodiment, the latency caused by the intermediate nodes in the actual network paths is ignored for purposes of determining the maximum geographic distance between the starting nodes and the POPs.

Figure 13:
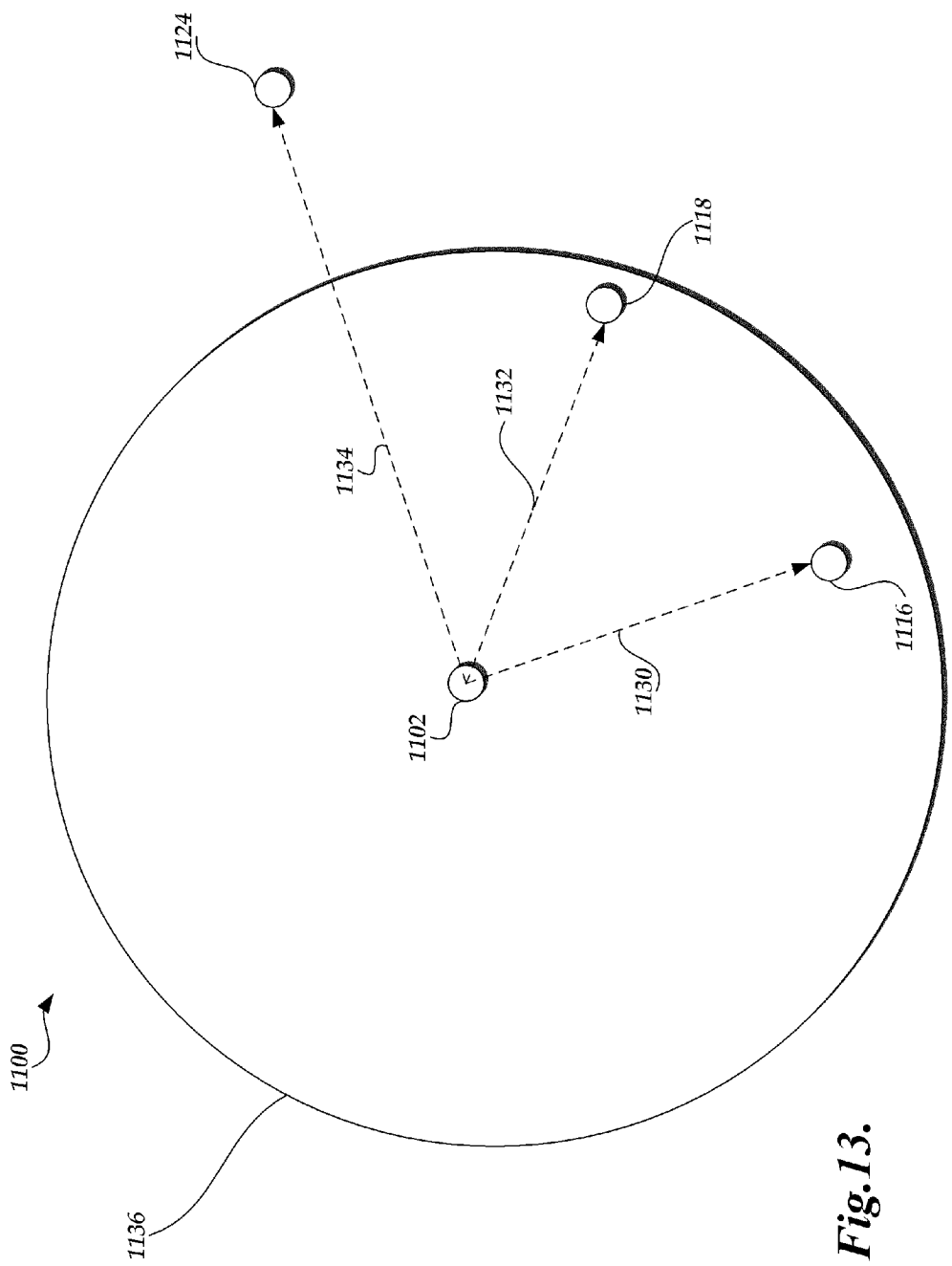

At decision block 1008, a test is conducted to determine whether the maximum distance associated with the currently selected POP is above the maximum geographic threshold allowed for a POP. If not, the POP is added to a set of POPs available for selection at block 1010. FIG. 13 illustrates the three calculated maximum distances for paths 1130, 1132, 1134 between node 1102 and nodes 1116, 1118 and 1124, respectively. Additionally, the maximum geographic threshold is illustrated as a circle 1136 having a radius corresponding to the calculated maximum geographic threshold from the central node in any direction. As illustrated in FIG. 13, the calculated maximum geographic distance for path 1130 and 1132 is within the maximum geographic threshold 1136, while the calculated maximum geographic distance for path 1134 is above the maximum geographic threshold 1136. One skilled in the relevant art will appreciate that alternative geographic shapes or multiple geographic maximums may be implemented.

If at decision block 1008, the calculated geographic distance is above the maximum distance, or once a POP has been added to the set of POPs available for selection, at decision block 1012, a test is conducted to determine whether there are additional POPs in the original set of POPs. If so, the sub-routine 1000 returns to block 1004 for processing of the performance measurement information for the next POP in the original set of POPs. Alternatively, if no additional POPs remain in the original set of POPs, the sub-routine 1000 returns with the selection of POP from the set of available POPs. In one embodiment, the POP selection can be based on a relative comparison of performance measurement information (e.g., the POP associated with the lowest latency). In another embodiment, the POP selection can be based on random selection or a weighted selection based on performance measurement information. In still another embodiment, additional criteria, such as geographic criteria, cost criteria, etc. may be utilized to select a POP from the set of available POPs.

While illustrative embodiments have been disclosed and discussed, one skilled in the relevant art will appreciate that additional or alternative embodiments may be implemented within the spirit and scope of the present invention. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface; further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for request routing comprising:
    obtaining a DNS query from a client computing device at a first DNS server, wherein the DNS query corresponds to a requested resource associated with an original resource identifier provided by a content provider and wherein the first DNS server corresponds to a content delivery network service provider that is different from the content provider;
    selecting a second DNS server from one or more alternative DNS servers based at least in part on at least a calculated distance associated with each of the one or more alternative DNS servers and performance measurement information associated with each of the one or more alternative DNS servers;
    obtaining an alternative resource identifier corresponding to the selected second DNS server, wherein the alternative resource identifier includes information for causing a DNS query to resolve to a domain corresponding to the content delivery service provider;
    transmitting the alternative resource identifier to the client computing device;
    obtaining a subsequent DNS query from the client computing device at a second DNS server, wherein the subsequent DNS query corresponds to the alternative resource identifier provided by the content delivery network service provider and wherein the second DNS server corresponds to the content delivery network service provider that is different from the content provider;
    determining whether the second DNS server is authoritative to the subsequent DNS query;
    selecting a cache component for providing content associated with the original resource request if the second DNS server is authoritative to the subsequent DNS query; and
    transmitting information identifying the selected cache component if the second DNS server is determined to be authoritative.

2. The method as recited in claim 1, wherein the original resource identifier corresponds to a uniform resource locator provided by the content provider such that the DNS query resolves to a domain corresponding to the content delivery network service provider.

3. The method as recited in claim 1, wherein the original resource identifier and the alternative resource identifier include information identifying a same domain corresponding to the content delivery service provider.

4. The method as recited in claim 1, wherein the original resource identifier includes information identifying a first domain corresponding to the content delivery service provider and wherein the alternative resource identifier includes information identifying a second domain corresponding to the content delivery service provider.

5. The method as recited in claim 1, wherein selecting the second DNS server from the identified one or more alternative DNS servers based at least in part on at least a calculated distance associated with each of the one or more alternative DNS servers includes selecting the second DNS server based at least in part on a calculated distance from each of the one or more alternate DNS servers and a reference node in a communication network.

6. The method as recited in claim 1, wherein selecting the second DNS server from the identified one or more alternative DNS servers based at least in part on at least a calculated distance associated with each of the one or more alternative DNS servers includes selecting the second DNS server based at least in part on a calculated distance from each of the one or more alternate DNS servers and the client computing device.

7. The method as recited in claim 1, wherein selecting the second DNS server from the identified one or more alternative DNS servers based at least in part on at least a calculated distance associated with each of the one or more alternative DNS servers includes determining a calculated maximum distance as a product of a latency time associated with a selected DNS server and a speed of transmission.

8. The method as recited in claim 1, wherein selecting a second DNS server from the identified one or more alternative DNS servers based at least in part on performance measurement information associated with each of the one or more alternative DNS servers includes:
    determining performance measurement information for the one or more DNS servers;
    determining whether the performance measurement information exceeds a minimum performance threshold; and
    excluding DNS servers in which performance measurement information does not exceed the performance threshold.

9. The method as recited in claim 8, wherein the performance measurement information corresponds to a measured latency.

10. The method as recited in claim 8, wherein the performance measurement information corresponds to assigned categories associated with performance measurement.

11. The method as recited in claim 1 further comprising:
    prior to transmitting the alternative resource identifier, determining whether the first DNS server would be authoritative for a DNS query corresponding to the alternative resource identifier;
    selecting a cache component for providing content associated with the original resource request if the first DNS server would be authoritative for a DNS query corresponding to the alternative resource identifier; and
    transmitting information identifying the selected cache component if the first DNS server would be authoritative for a DNS query corresponding to the alternative resource identifier.

12. A computer-implemented method for request routing comprising:
    obtaining a DNS query from a client computing device at a first DNS server, wherein the DNS query corresponds to a requested resource associated with an original resource identifier provided by a content provider and wherein the first DNS server corresponds to a content delivery network service provider that is different from the content provider;
    obtaining an alternative resource identifier based at least in part on at least a calculated distance associated with each of one or more alternative network components and performance measurement information associated with each of the one or more alternative network components;
    determining whether the first DNS server would be authoritative for a DNS query corresponding to the alternative resource identifier;
    selecting a cache component for providing content associated with the original resource request if the first DNS server would be authoritative for a DNS query corresponding to the alternative resource identifier; and transmitting information identifying the selected cache component if the first DNS server would be authoritative for a DNS query corresponding to the alternative resource identifier.

13. The method as recited in claim 12 further comprising:
transmitting the alternative resource identifier to the client computing device if the first DNS server would not be authoritative for the DNS query corresponding to the alternative resource identifier;
obtaining a subsequent DNS query from the client computing device at a second DNS server, wherein the subsequent DNS query corresponds to the alternative resource identifier provided by the content delivery network service provider and wherein the second DNS server corresponds to the content delivery network service provider that is different from the content provider;
determining whether the second DNS server is authoritative to the subsequent DNS query; and
selecting a cache component for providing content associated with the original resource request if the second DNS server is authoritative to the subsequent DNS query; and
transmitting information identifying the selected cache component if the second DNS server is determined to be authoritative.

14. A system for request routing comprising:
a first network point of presence associated with a content delivery network service provider, wherein the first network point of presence includes a DNS server that is operative to:
    obtain a DNS query from a client computing device, wherein the DNS query corresponds to a requested resource associated with an original resource identifier provided by a content provider and wherein the content delivery network service provider is different from the content provider;
    select a second DNS server from one or more alternative DNS servers based at least in part on at least a calculated distance associated with each of the one or more alternative DNS servers and performance measurement information associated with each of the one or more alternative DNS servers;
    obtain an alternative resource identifier corresponding to the selected second DNS server, wherein the alternative resource identifier includes information for causing a DNS query to resolve to a domain corresponding to the content delivery service provider; and
    transmit the alternative resource identifier to the client computing device;
a second network point of presence associated with the content delivery network service provider, wherein the second network point of presence includes the second DNS server and wherein the second DNS server is operative to:
    obtain a subsequent DNS query from the client computing device, wherein the subsequent DNS query corresponds to the alternative resource identifier provided by the content delivery network service provider;
    determine whether the second DNS server is authoritative to the subsequent DNS query;
    select a cache component for providing content associated with the original resource request if the second DNS server is authoritative to the subsequent DNS query; and
    transmit information identifying the selected cache component if the second DNS server is determined to be authoritative.

15. The system as recited in claim 14, wherein the original resource identifier corresponds to a uniform resource locator provided by the content provider such that the DNS query resolves to a domain corresponding to the content delivery network service provider.

16. The system as recited in claim 14, wherein the original resource identifier and the alternative resource identifier include information identifying a same domain corresponding to the content delivery service provider.

17. The system as recited in claim 14, wherein the original resource identifier includes information identifying a first domain corresponding to the content delivery service provider and wherein the alternative resource identifier includes information identifying a second domain corresponding to the content delivery service provider.

18. The system as recited in claim 14, wherein selecting the second DNS server from the identified one or more alternative DNS servers based at least in part on at least a calculated distance associated with each of the one or more alternative DNS servers includes selecting the second DNS server based at least in part on a calculated distance from each of the one or more alternate DNS servers and a reference node in a communication network.

19. The system as recited in claim 14, wherein selecting the second DNS server from the identified one or more alternative DNS servers based at least in part on at least a calculated distance associated with each of the one or more alternative DNS servers includes selecting the second DNS server based at least in part on a calculated distance from each of the one or more alternate DNS servers and the client computing device.

20. The system as recited in claim 14, wherein selecting the second DNS server from the identified one or more alternative DNS servers based at least in part on at least a calculated distance associated with each of the one or more alternative DNS servers includes determining a calculated maximum distance as a product of a latency time associated with a selected DNS server and a speed of transmission.

21. The system as recited in claim 14, wherein selecting a second DNS server from the identified one or more alternative DNS servers based at least in part on performance measurement information associated with each of the one or more alternative DNS servers includes:
    determining performance measurement information for the one or more DNS servers;
    determining whether the performance measurement information exceeds a minimum performance threshold; and
    excluding DNS servers in which performance measurement information does not exceed the performance threshold.

22. The system as recited in claim 14, wherein the DNS server in the first network point of presence is further operative to:
    prior to transmitting the alternative resource identifier, determine whether the first DNS server would be authoritative for a DNS query corresponding to the alternative resource identifier;
    select a cache component for providing content associated with the original resource request if the first DNS server would be authoritative for a DNS query corresponding to the alternative resource identifier; and
    transmit information identifying the selected cache component if the first DNS server would be authoritative for a DNS query corresponding to the alternative resource identifier.

23. A system for request routing comprising:
a first network point of presence associated with a content delivery network service provider, wherein the first network point of presence includes a first DNS server that is operative to:
  obtain a DNS query from a client computing device, wherein the DNS query corresponds to a requested resource associated with an original resource identifier provided by a content provider and wherein the content delivery network service provider is different from the content provider;
  obtain an alternative resource identifier based at least in part on at least a calculated distance associated with each of one or more alternative network components and performance measurement information associated with each of the one or more alternative network components;
  determine whether the first DNS server would be authoritative for a DNS query corresponding to the alternative resource identifier;
  select a cache component for providing content associated with the original resource request if the first DNS server would be authoritative for a DNS query corresponding to the alternative resource identifier; and
  transmit information identifying the selected cache component if the first DNS server would be authoritative for a DNS query corresponding to the alternative resource identifier.

24. The system as recited in claim 23, wherein the first DNS server is further operative to transmit the alternative resource identifier to the client computing device if the first DNS server would not be authoritative for the DNS query corresponding to the alternative resource identifier.

25. The system as recited in claim 24 further comprising:
a second network point of presence associated with the content delivery network service provider, wherein the second network point of presence includes a second DNS server that is operative to:
  obtain a subsequent DNS query from the client computing device, wherein the subsequent DNS query corresponds to the alternative resource identifier provided by the content delivery network service provider;
  determine whether the second DNS server is authoritative to the subsequent DNS query; and
  select a cache component for providing content associated with the original resource request if the second DNS server is authoritative to the subsequent DNS query; and
  transmit information identifying the selected cache component if the second DNS server is determined to be authoritative.

* * * * *

UNITED STATES PATENT AND TRADEMARK OFFICE
CERTIFICATE OF CORRECTION

Page 1 of 1

PATENT NO. : 8,676,918 B2
APPLICATION NO. : 13/620976
DATED : March 18, 2014
INVENTOR(S) : David R. Richardson It is certified that error appears in the above-identified patent and that said Letters Patent is hereby corrected as shown below:

Title Page, Line 2 of Item (62), under "Related U.S. Application Data," please delete "9,468,247" and insert --8,468,247--.

IN THE SPECIFICATION:

At Col. 1, Line 19, please delete "user," and insert --user--.

At Col. 6, Line 44, please delete ""corn"" and insert --"com"--.

At Col. 6, Line 45, please delete ""corn"" and insert --"com"--.

At Col. 6, line 50, please delete ""corn"" and insert --"com"--.

At Col. 11, Line 10, please delete "sever" and insert --server--.

Signed and Sealed this
Sixth Day of January, 2015

Michelle K. Lee
*Deputy Director of the United States Patent and Trademark Office*